(12) United States Patent
Asami

(10) Patent No.: US 7,441,190 B2
(45) Date of Patent: Oct. 21, 2008

(54) AGENT SYSTEM, INFORMATION PROVIDING METHOD, INFORMATION PROVIDING APPARATUS, AND DATA RECORDING MEDIUM

(75) Inventor: Akiko Asami, Shizuoka (JP)

(73) Assignee: Sony Corporation (JP)

(*) Notice: Subject to any disclaimer, the term of this patent is extended or adjusted under 35 U.S.C. 154(b) by 466 days.

(21) Appl. No.: 10/149,542

(22) PCT Filed: Sep. 11, 2001

(86) PCT No.: PCT/JP01/07882

§ 371 (c)(1),
(2), (4) Date: Sep. 17, 2002

(87) PCT Pub. No.: WO02/23397

PCT Pub. Date: Mar. 21, 2002

(65) Prior Publication Data

US 2003/0052914 A1 Mar. 20, 2003

(30) Foreign Application Priority Data

Sep. 11, 2000 (JP) .............................. 2000-275637

(51) Int. Cl.
*G06F 3/00* (2006.01)
(52) U.S. Cl. ........................ 715/706; 715/708; 715/716; 715/972
(58) Field of Classification Search ................. 715/706, 715/716, 746, 708, 972
See application file for complete search history.

(56) References Cited

U.S. PATENT DOCUMENTS

| | | | | |
|---|---|---|---|---|
| 5,682,469 A | * | 10/1997 | Linnett et al. | 345/473 |
| 6,088,731 A | * | 7/2000 | Kiraly et al. | 709/229 |
| 6,369,821 B2 | * | 4/2002 | Merrill et al. | 345/473 |
| 6,434,525 B1 | * | 8/2002 | Nagisa et al. | 704/260 |
| 6,615,172 B1 | * | 9/2003 | Bennett et al. | 704/257 |
| 6,766,320 B1 | * | 7/2004 | Wang et al. | 707/5 |
| 6,798,426 B1 | * | 9/2004 | Tateishi | 715/706 |
| 2002/0005865 A1 | * | 1/2002 | Hayes-Roth | 345/706 |
| 2005/0086059 A1 | * | 4/2005 | Bennett | 704/270 |

* cited by examiner

*Primary Examiner*—David Wiley
*Assistant Examiner*—Ryan Pitaro
(74) *Attorney, Agent, or Firm*—Lerner, David, Littenberg, Krumholz & Mentlik, LLP

(57) ABSTRACT

An agent system which provides information for a user, displaying a character, includes: an agent program provided in a user computer connectable to a communication channel network; a user information storage part that stores user information; and a character display data storage part that stores character display data for determining a display form of the character. The agent program performs processing of collecting the user information and information selected by the user information, processing of creating a key word specific to the user based on the user information and the selected information, and processing of providing information, varying the display form related to the character from the selected information and the character display data, for every item of information. That is, a character as a virtual creature is provided in an information communication apparatus such as a personal computer or the like, so that information can be collected with interests and fun through communication between the user and the character.

14 Claims, 19 Drawing Sheets

*27a*

| ACTION1 | ADDRESS×××21 | | |
|---------|--------------|---|---|
| ACTION2 | ADDRESS×××22 | | |
| ACTION3 | EXPRESSION1 | ADDRESS×××11 | |
| ACTION4 | EXPRESSION2 | ADDRESS×××12 | |
| ACTION5 | EXPRESSION3 | FACE1 | ADDRESS×××01 |
| ACTION6 | EXPRESSION4 | FACE2 | ADDRESS×××02 |
| ACTION7 | EXPRESSION5 | FACE3 | ADDRESS×××03 |
| ACTION8 | EXPRESSION6 | FACE4 | ADDRESS×××04 |
| | EXPRESSION7 | FACE5 | ADDRESS×××05 |
| | EXPRESSION8 | FACE6 | ADDRESS×××06 |
| | | FACE7 | ADDRESS×××07 |
| | | FACE8 | ADDRESS×××08 |

FIG.10

AGENT SYSTEM, INFORMATION PROVIDING METHOD, INFORMATION PROVIDING APPARATUS, AND DATA RECORDING MEDIUM

TECHNICAL FIELD

The present invention relates to an agent system, an information providing method and apparatus, and a data recording medium, and particularly, to an agent between computers and human being. Specifically, the present invention relates to an agent system, an information providing method and apparatus, and a data recording medium which are capable of displaying an animation character to connect to the Internet, operate computers including information search and the like, and exchange information through communication with the character.

BACKGROUND ART

Since information devices such as personal computers and the like have spread, various information can be obtained by means of Internet. The Internet is a large scale network of a horizontal dispersion type extended over the world, like an arachnoid or a chain. Users can access predetermined Web servers to obtain necessary information with use of personal computers or the like.

Known as a method of efficiently obtaining information necessary for user themselves from the Internet are search engine sites. Search engine sites are constructed such that Web pages which comply with a key word are presented by inputting a predetermined keyword.

Known also as a technique which performs information search or the like in place of users is an agent technique. This agent technique is constructed such that software as an agent of a user is stationed in a computer and starts up in response to an event, to make aimed action on the network. The technique uses an autonomous program which carries out services as an agent of the user on the network. For example, in case of checking a stock, when a place where a certain item exists is instructed, the agent automatically accesses a stock system of a stock room from the computer where the agent itself is stationed, and investigates whether the item is present or not. If not, the agent goes to other stock systems one after another, moving on the communication channel.

However, when information is obtained from the Internet, a search engine site can be less and less easily connected in a conventional method based on search engine sites, as the users who use the search engine site increase. Consequently, a problem arises in that much time is required to search information.

In addition, in the conventional Internet environment, it takes long time to display the Web page even if a desired Web page is found. This causes a drawback that the user wastes the time.

Usually, information relating to various searchs are concentrated on a search engine site from various users. Most users, however, use dial-up connection so that telephone fees are charged by Internet connection. It is therefore difficult for users to connect the Internet for a long time over all time range.

Users hence search only most necessary information at the present time and do not tend to search at once what daily occur to them or what is not necessary enough to collect.

To access the Internet and browse Web contents, browser software called a Web browser is used. The browser software is constructed to be useful for users who are used to the software but is unfamiliar to those who utilizes the Internet for the first time.

Further, in the agent technique, search and the like can be carried out with respect to an item instructing a predetermined content and information thereof can be notified. In case of a situation that many instructions are provided, there is a drawback that the user cannot distinguish the information notified from the agent.

Thus, according to a conventional search method using the Internet, users can obtain necessary information at times. However, there are less chances for newly searching for information in which users are always vaguely interested or information about which users are usually worried. In addition, if many instructions are given to the agent when using the agent technique, there is a problem that it is difficult for the user to know intuitively what is the information notified from the agent.

DISCLOSURE OF THE INVENTION

An object of the present invention is to provide an agent system, an information providing method and apparatus, and a data recording medium in which a character is let live in an information communication device such as a personal computer or the like so that information can be collected with interest and fun through communication between the user and the character.

Another object of the present invention is to provide an agent system, an information providing method and apparatus, and a data recording medium in which information provided by the character can be distinguished intuitively in the communication between the user and the character.

To achieve the above objects, an agent system according to the present invention provides information for a user, displaying a character, and comprises: an agent program part provided in a user computer connectable to a communication channel network; a user information storage part which stores user information; and a character display data storage part which stores character display data for determining a display form of the character. The agent program part performs processing of collecting the user information and information selected by the user information, processing of creating a key word specific to the user based on the user information and the selected information, and processing of providing information, varying the display form related to the character from the selected information and the character display data, for every item of information.

Thus, the agent system according to the present invention is constructed such that a key word is created and selected information is presented, based on user information. Another key word is further created from the selected information, and other information is presented. Therefore, the user can obtain information which complies with tastes of the user.

Also, in the agent system according to the present invention, information is provided through a character. At this time, the display form of the character is determined in compliance with the type of the information, and information is presented by a character which has different appearances respectively for information items. As a result of this, when the user see the appearance of the character, the user can intuitively distinguishes what the information relates to, so that the user can accept information smoothly without confusion. Information presented to the user is, for example, information provided in a server connected through a communication channel network, information from the Web page searched in the server, or the like.

If information is previously read into a terminal of the user and is then displayed when presenting information from the Web page, waiting time till the user reads the information can be reduced. Alternatively, if information from the Web page is previously downloaded and is then displayed, the user can read it unhurriedly after turning the system off line.

Key words for selecting information to be provided are created from answers to questions given to the user. Also, the key words include addresses of the Web pages which show the most effective information for the user.

The agent system according to the present invention can be used at home or at places where the user goes. That is, the agent system can be used at outdoor places if the agent system is provided in a portable mobile terminal.

An information providing method according to the present invention provides a user with information by a displayed character, comprising steps of: collecting individual information of the user; creating a key word, based on the individual information of the user; searching specific information, based on the key word; specifying a form of the character as a predetermined form related to search result information obtained by search; and providing the search result information for the user by the character in the specified form.

Specific information is information from the Web pages, and a key word is further created based on search result information. Thus, according to the information providing method of the present invention, it is possible to provide information which complies with need of each user, based on information specific to the user. In addition, the information is provided by a character having a form which expresses the contents of the information, so that it is possible to distinguish what contents the information to be provided has at a glance of the character.

Individual information of the user is obtained by presenting a question to the user and by collecting an answer to the presented question. According to the information providing method of the present invention, questions are presented by the character, so that the user can answer with real intentions without posture. Accordingly, interest targets of the user can be grasped consciously. Alternatively, in conversation between the user and the character, individual information of the user can be obtained by selecting predetermined words inputted from the user. Therefore, the things which the user is vaguely interested in or thinks about can be grasped through conversation with the character.

Also, an information providing apparatus according to the present invention comprises: a processing part which executes processing of obtaining user information, processing of determining a character display form from character display data, processing of collecting the user information and/or information selected by the user information, processing of creating a key word specific to the user based on the user information and/or the selected information, and processing of providing information, varying a display form related to the character from the selected information and the character display data, for every item of information; a transmission/reception part which transmits/receives information to/from another computer through a communication channel network; an information storage part which stores predetermined information; and an information search part which searches information in the information storage part from the key word.

An agent program may execute the processing of obtaining user information, the processing of determining a character display form from character display data, the processing of collecting the user information and/or information selected by the user information, processing of creating a key word specific to the user based on the user information and/or the selected information, and the processing of providing information, varying a display form related to the character from the selected information and the character display data, for every item of information. The structure can be arranged such that the agent program is executed by a user computer or a server computer.

In addition, the user computer or the server computer may be constructed so as to comprise the transmission/reception part which transmits/receives information to/from another computer through a communication channel network, the information storage part which stores predetermined information, and the information search part which searches information in the information storage part from the key word inputted from the user computer.

In addition, the agent program which constructs the agent system can be stored in a data recording medium and is structured such that the program can be installed into a server computer or a user computer. Also, the user computer includes a portable mobile terminal.

Also, the data recording medium according to the present invention records a program for making at lest a computer execute an information collection step of collecting user information and information selected by the user information, a key word creation step of creating a key word specific to a user, based on the user information and the selected information, a display form selection step of selecting a display form of a character, varying the display form related to the selected information, based on the selected information, for every item of information, and an information providing step of displaying the selected information through the character displayed based on the selected display form.

The program described above will now be explained specifically. The agent program 22 comprises, as steps of collecting user information, the agent program steps S24 and S25 of the key word creation processing (A) (progressing for giving a question or the like to the user and obtaining an answer thereto), and as a step of collecting selected information, a step S39 of the information providing processing (B) (processing for information search from a key word or inputted word).

Also, the agent program 22 comprises, as steps of creating a key word based on user information, steps S26 and S27 of the key word creation processing (A) (processing for creating a key word from an answer of the user), and as steps of creating a key word based on selected information, a step S42 of the server information providing processing (B) (processing for determining key word creation from server information), a step S55 of the Web page information processing (C) (processing for taking an address of a favorite Web page as a key word), and a step S66 of the information providing processing for the user (D) (processing for determining key word creation from provided information).

Further, the agent program 22 comprises, as steps of selecting a display form for selecting a display form of a character, steps S71-1 to S83-1 of the character form processing (E-1) (processing for changing the face of the character in compliance with the contents of information).

Furthermore, the agent program 22 comprises, as an information providing step, a step S77-1 of the character form processing (E-1) (processing for presenting information from a character having a face which complies with the contents of information).

The key word creation step may be constructed so as to include a step of supplying the user with a question, a step of collecting an answer from the user to the question, and a step of creating a key word based on the collected answer.

The above steps will now be explained specifically based on an embodiment. The agent program 22 comprises, as a step of giving a question to the user, a step S24 of the key word creation processing (A) (a step of giving a question to the user), as a step of collecting an answer from the user, a step S25 of the key word creation processing (A) (processing for obtaining an answer to the question), and as a step of creating a key word based on an answer, a step S26 of the key word creation processing (A) (processing for creating a key word from an answer).

Also, the key word creation step may be constructed so as to include a step of collecting the information selected by the user information, and a step of creating a key word, based on the collected information.

The above step will now be explained specifically based on an embodiment. The agent program 22 comprises, as steps of collecting information to be provided for the user, steps S39 to S41 of the information providing processing for the user (B) (processing for making information search and providing server information), as steps of creating a key word based on server information, steps S43 to S45 (processing in which, for example, those key words that appear repeatedly or can become key words are taken as key words, among words included in server information).

Alternatively, the key word creation step may be constructed so as to include a step of collecting information from the Web page selected by the user information, and a step of creating a key word, based on the collected information from the Web page.

The above step will now be explained specifically based on an embodiment. The agent program 22 comprises, as a step of collecting information from the Web page, a step S46 of the information providing processing for the user (B) (processing for determining whether there is information from the web page as a result of making information search), and as a step of creating a key word based on information from an Web page, a step S55 of the information processing of the Web page (C) (processing for taking addresses of favorite Web pages as key words).

BRIEF DESCRIPTION OF THE DRAWINGS

FIG. 10 is a view showing a memory map;

BEST MODE FOR CARRYING OUT THE INVENTION

Hereinafter, an agent system, an information providing method, an information providing apparatus, and a data recording medium according to the present invention will be explained with reference to the drawings. Although the following explanation will be made of an agent system, the same explanation is also applicable to the information providing method, the information providing apparatus, and the data recording medium which records a program to be executed by a computer, of course. In addition, the members and layout explained below do not limit the present invention but can be variously modified within the range of the scope of the present invention.

Figure 7:
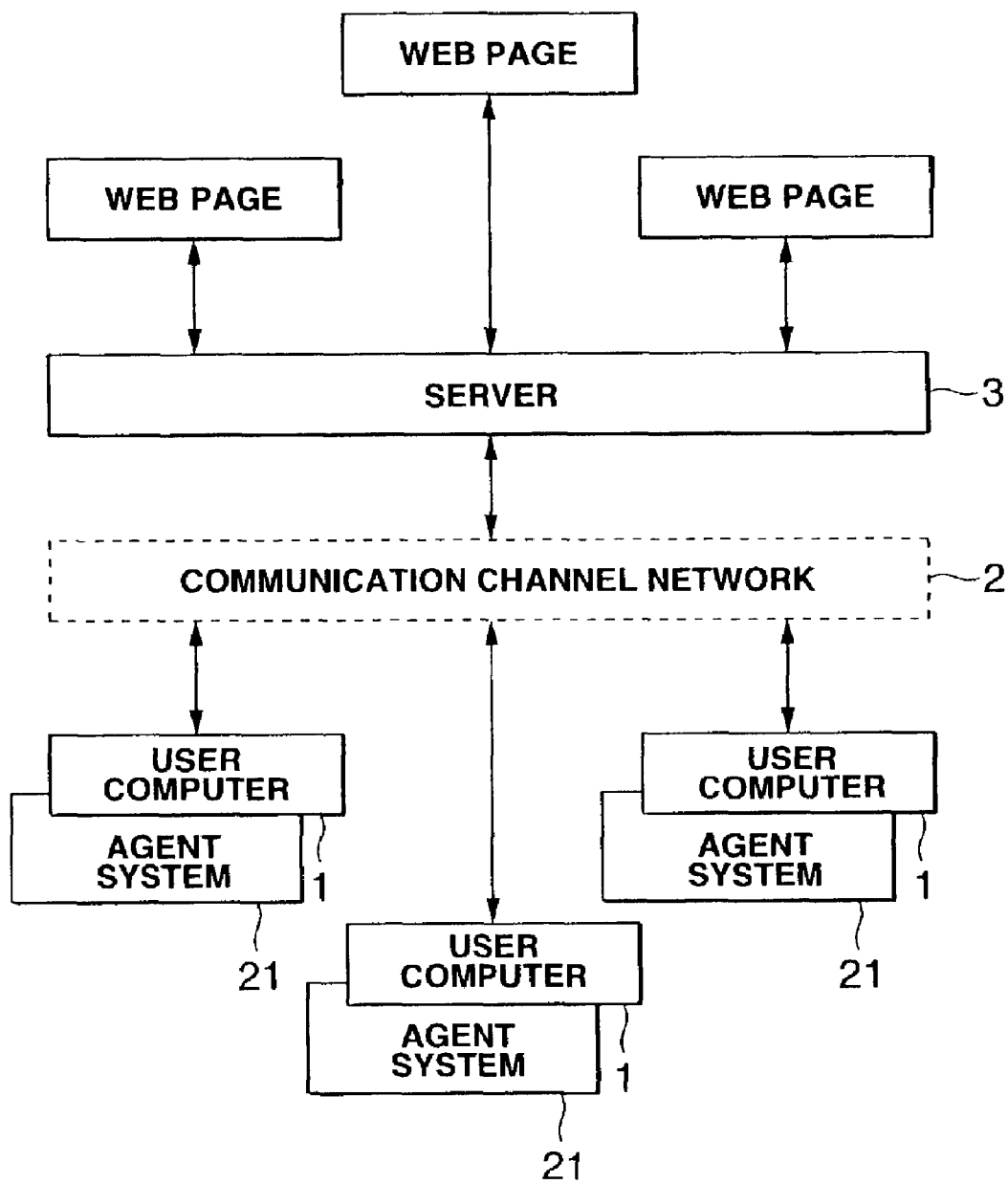
FIG. 7 is a view showing a relationship between a user computer, a communication channel network, and a server.
Figure 8:
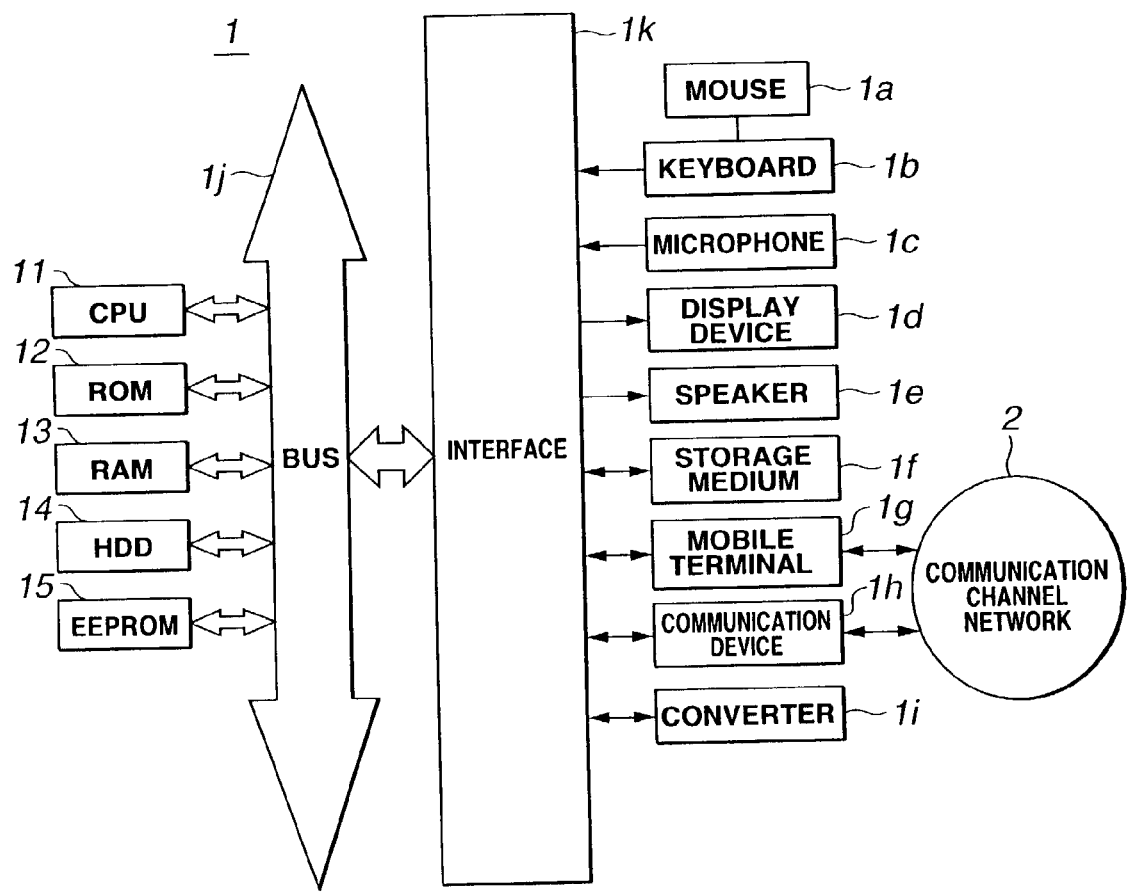
FIG. 8 is a block diagram showing a hardware structure of the user computer.
Figure 9:
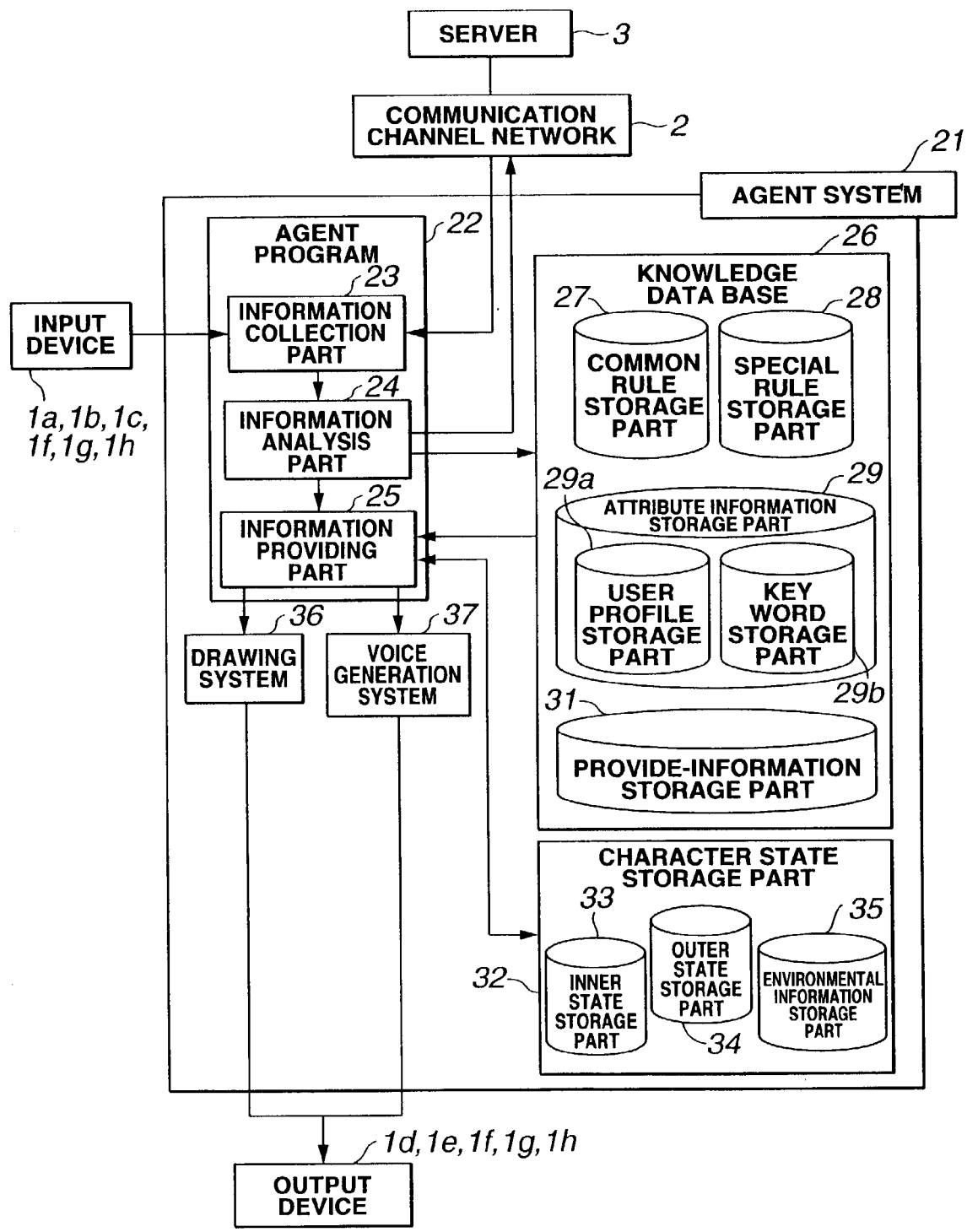
FIG. 9 is a block diagram showing a structure of an agent system.
Figure 11:
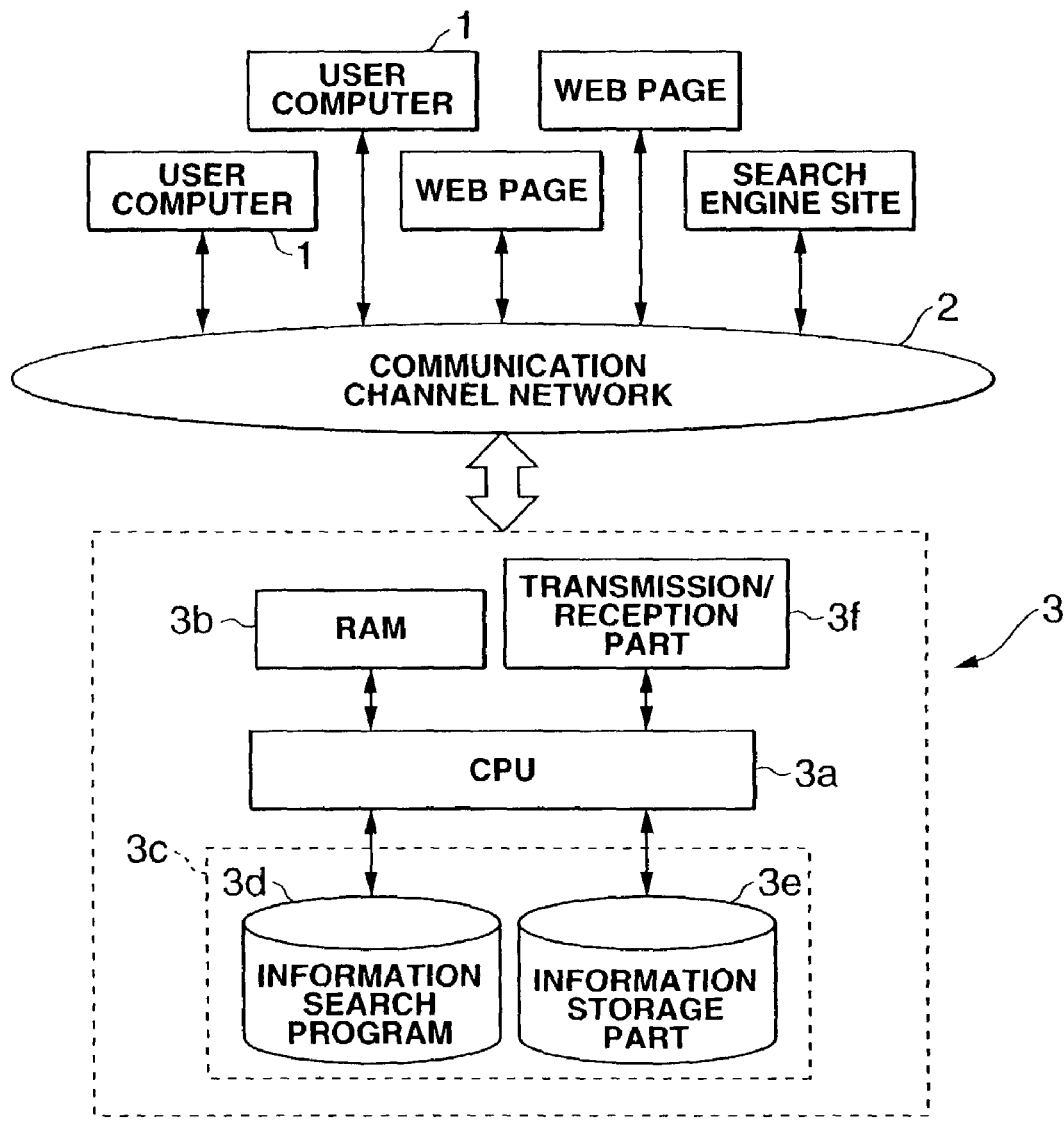
FIG. 11 is a block diagram showing a structure of a server apparatus.
Figure 19:
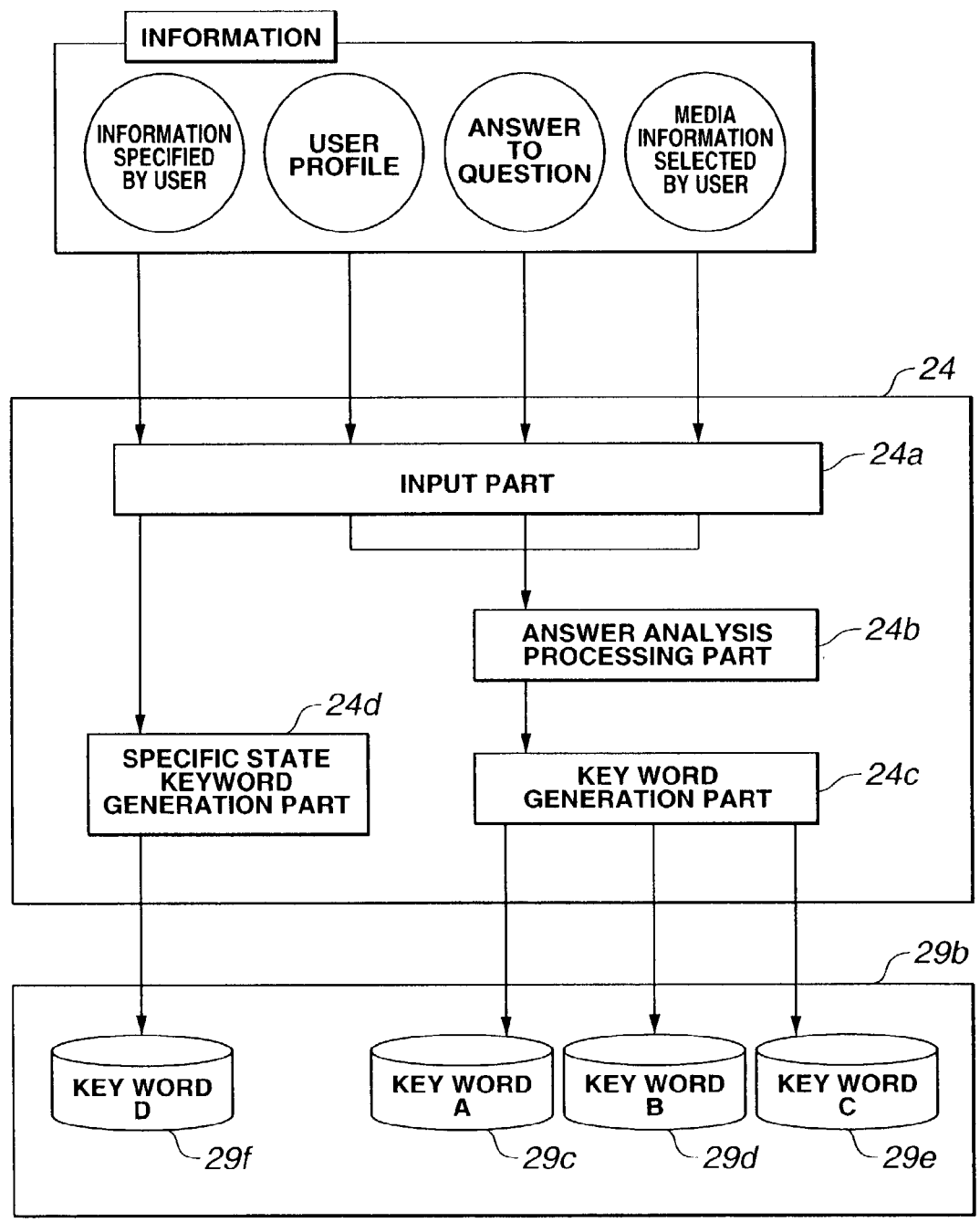
FIG. 19 is a block diagram showing key word creation.

FIGS. 1 to 6 are views showing an example of a character. FIG. 7 is a view showing the relationship between a user computer, a communication channel network, and a server. FIG. 8 is a block diagram showing the hardware configuration of the user computer. FIG. 9 is a block diagram showing the configuration of the agent system. FIG. 10 is a view showing a memory map. FIG. 11 is a block diagram showing the structure of the server apparatus. FIGS. 12 to 18 are explanatory flowcharts for processing based on the agent system. FIG. 19 is a block diagram showing key word preparation and storage processing.

(Outline of Agent System)

An agent system 21 to which the present invention is applied serves to provide services for users, using a character which is a virtual creature as a communication tool.

The agent system 21 to which the present invention is applied is stored as a software program in, for example, a HDD 14 or the like which will be described later. The system 21 lets a computer such as an information communication apparatus or the like (e.g., a user computer 1 in this example) comprising a display means or the like display a character, so that conversation is possible between the user and the character whether the apparatus is on or off line. User information can always be stored through the conversation, and the needs from the user can be grasped accurately by the stored information.

Further, in compliance with the needs from the user, necessary information is presented to the user from the side of the character displayed on the screen. At this time, the character K is displayed in different forms corresponding to the types of supplied information.

Figure 1:
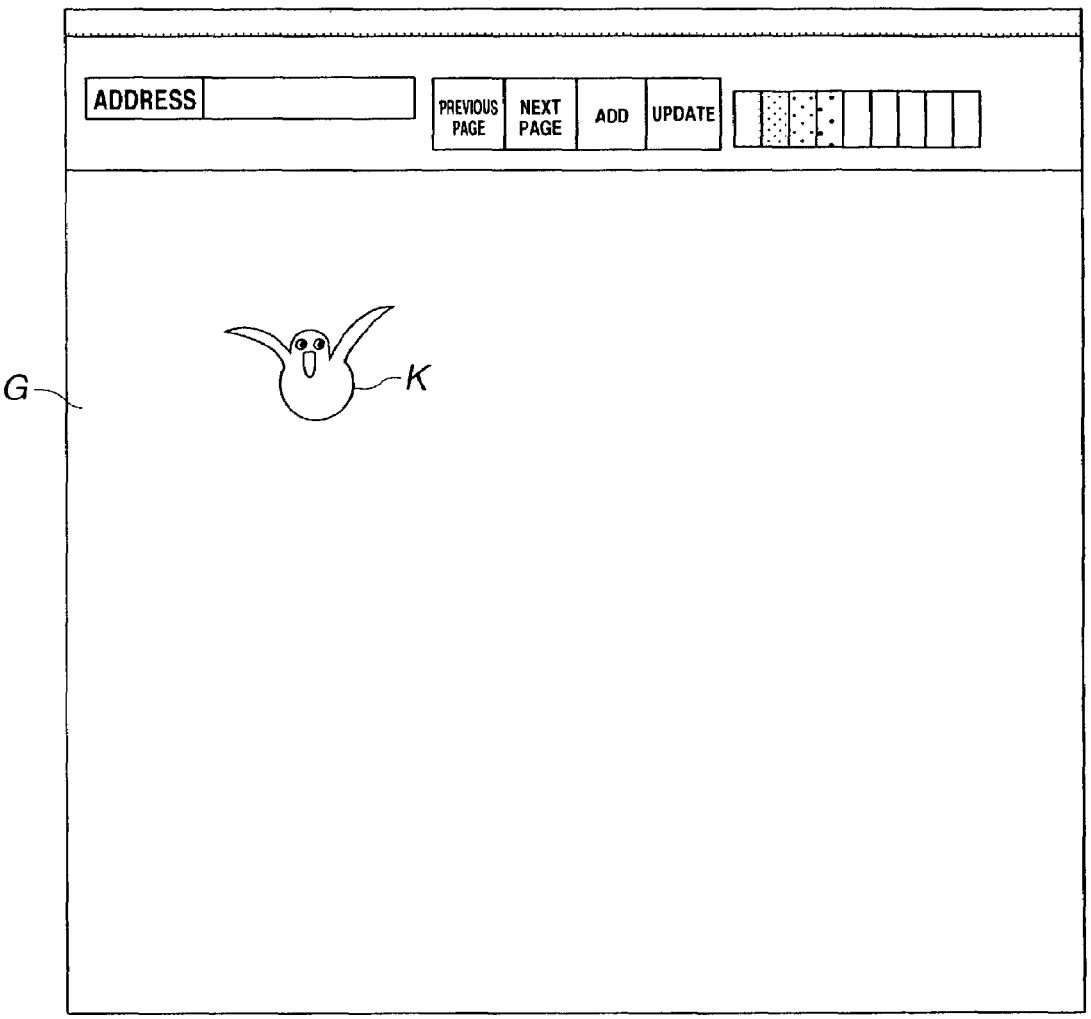
FIG. 1 is a view showing an example of a display form of a character.

Examples of display forms of the character are shown in FIGS. 1 to 6. In these examples, the agent system 21 is constructed such so as to immediately start operating when the power source of the computer 1 is turned on. Once the agent system 21 operates, the character K appears on the screen G of the display device, as shown in FIG. 1. At this time, if the character K has a form like a deformed bird as shown in the figure, the character is displayed such that it flies from a distance. Although the character K may be another animal or have an imaginary or fictious form, it is rather preferred that actions of the character remind users of feelings like "pretty", "fun", "heartwarming", and the like.

Figure 2:
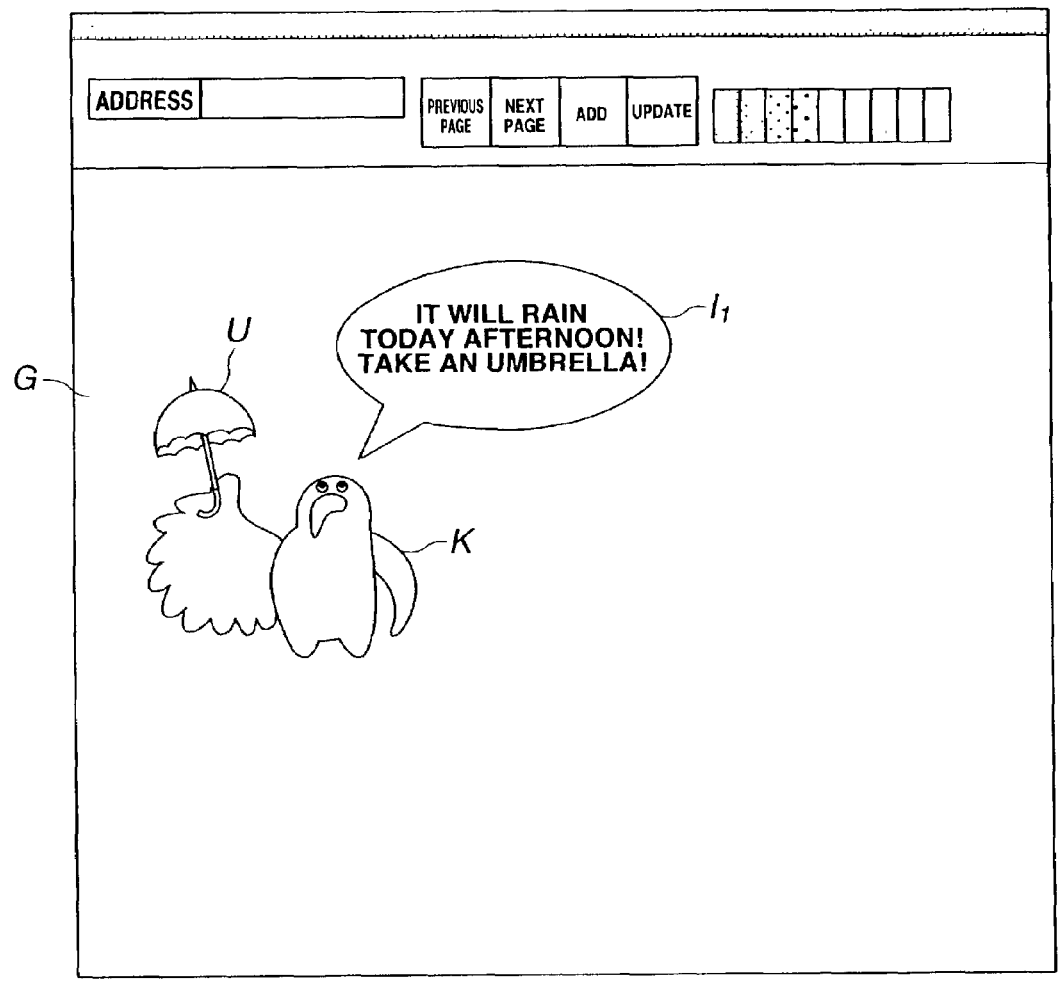
FIG. 2 is a view showing an example of a display form of a character.

The character K firstly makes greetings and provides information to users. For example, as shown in FIG. 2, the character is displayed with an umbrella U and provides the user with weather information $I_1$ that "It will rain this afternoon. Don't forget an umbrella!".

Figure 3:
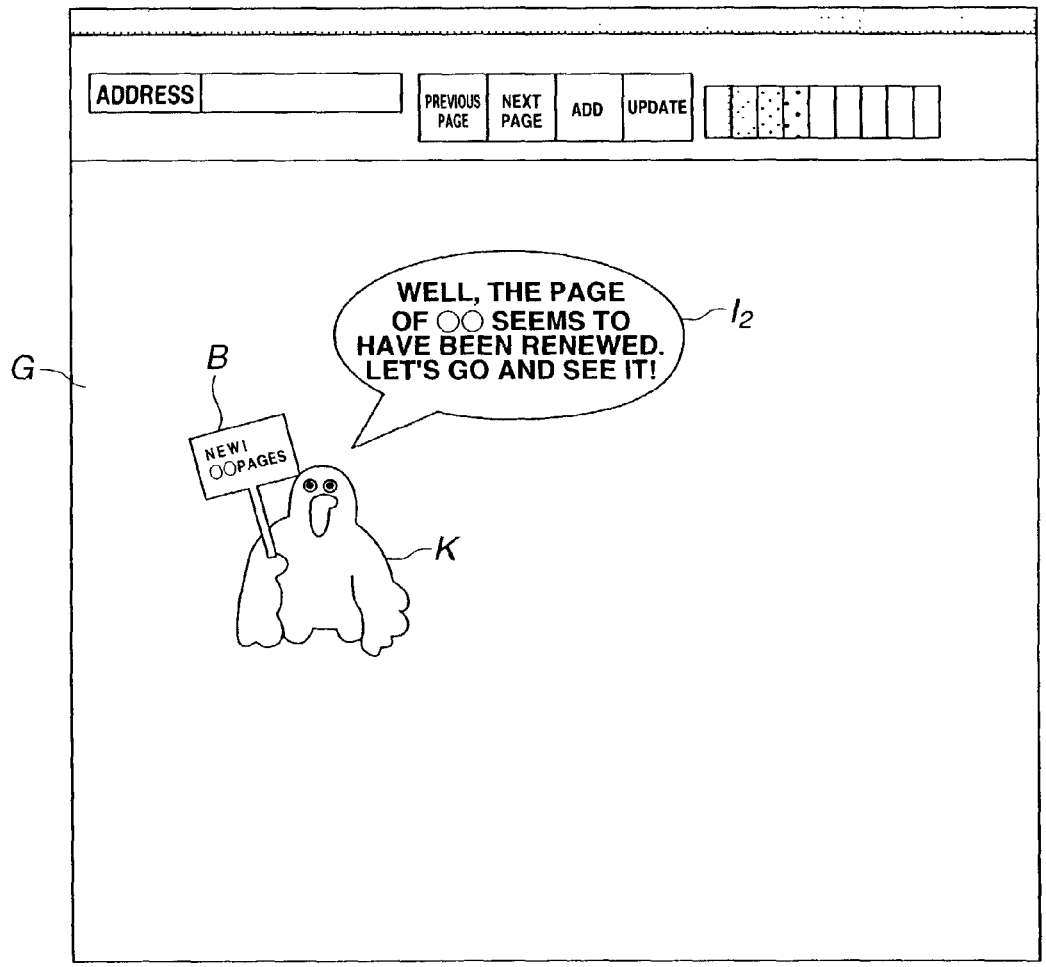
FIG. 3 is a view showing an example of a display form of a character.

Further, the character K provides information specific to the user or information from Web pages. For example, as shown in FIG. 3, in the situation that the user frequently uses a personal computer and is interested in personal computers, the user is supplied with information $I_2$ concerning personal computers from Web pages, saying that "Well, the (home) page of ∘∘ (indicating here a kind of personal computer) seems to have been renewed. Let's go!". At this time, the character K is displayed with a signboard B informing update of the Web page ("NEW! Page of ∘∘"), as shown in FIG. 3.

In addition to information presented one-way from the character K, the user side can make a reaction to information from the character, and the character's side can accept from information from the user side, to respond to user requests.

Figure 4:
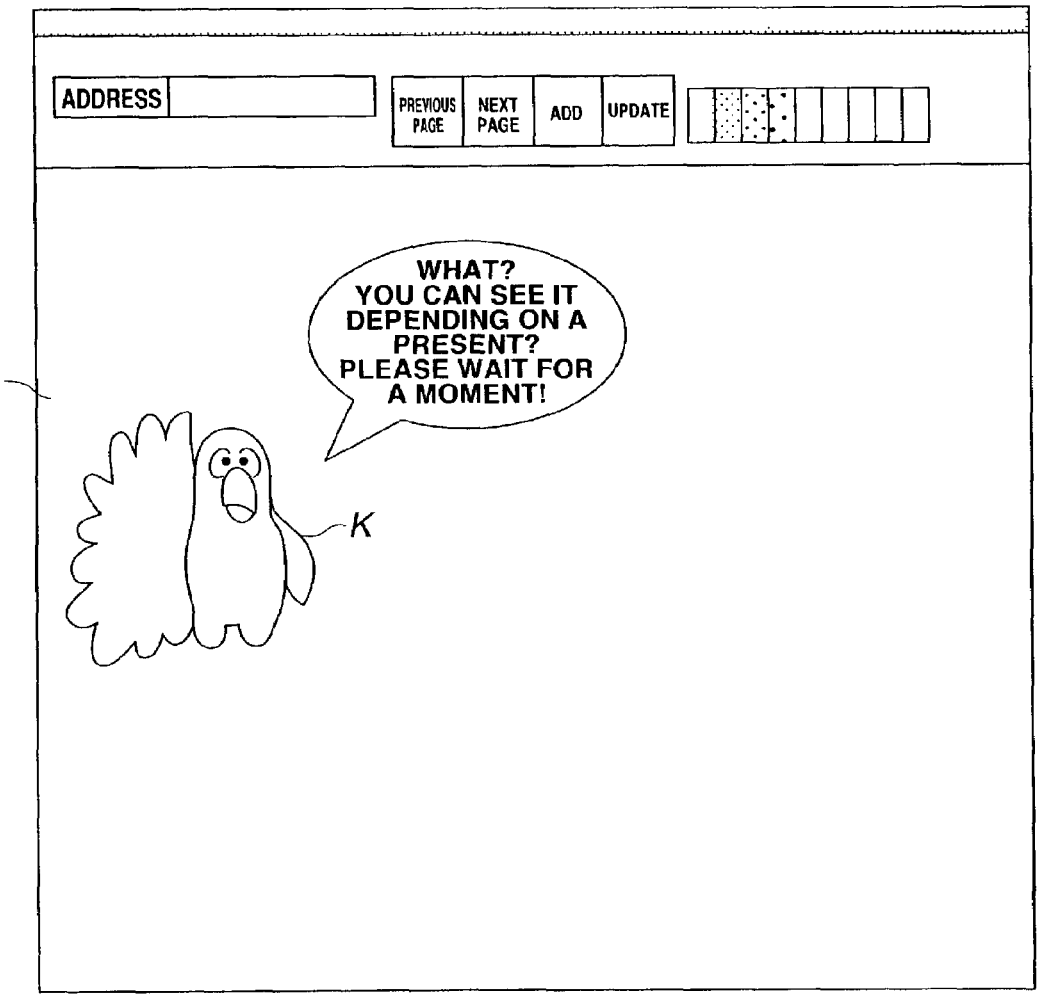
FIG. 4 is a view showing an example of a display form of a character.

Suppose, for example, a case that a question is made concerning information which the user wants to watch and the user side inputs a predetermined word (where the input includes key-board, voices, and the like) after information saying that "A home page has been renewed" is supplied. With respect to the word, whether information which the user wants to watch has been updated or not is searched for. At this time, as shown in FIG. 4, the character K says that "What? Can you watch it depending on a present? Please wait!" or so (this may be a voice, a text display using a frame, or both a voce and a text display). Thus, information is exchanged as if the character K and the user made conversation.

Figure 5:
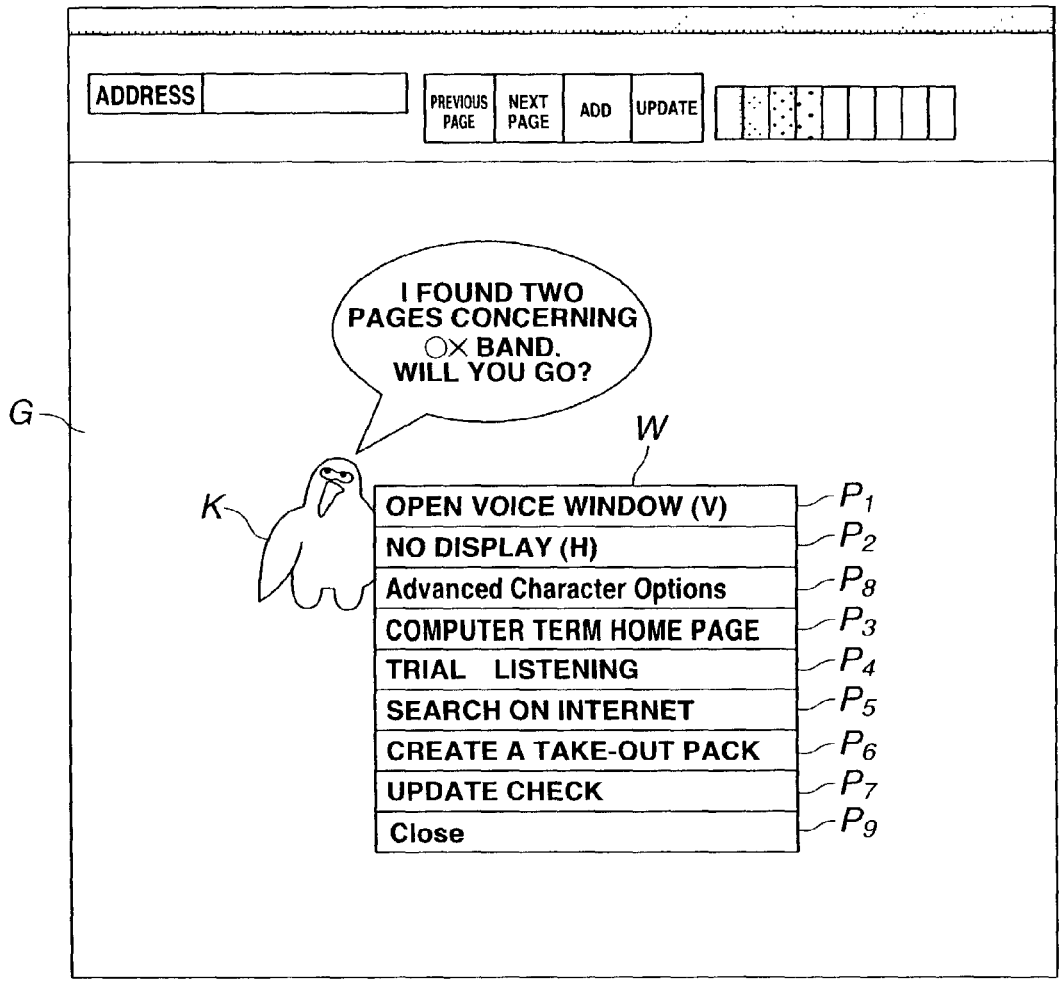
FIG. 5 is a view showing an example of a display form of a character.

Further, as shown in FIG. 5, a window W may be displayed with respect to instruction items frequently given from the user side. Displayed in this example is a menu including "Open voice window V", "no display (H)", "Advanced character options", "Computer term home page", "Trial listening", "Search on the Internet", "Create a mobile package", "Check update", "Close", and the like. For example, when $P_1$ "Open voice instruction window" and $P_4$ "Trial listening" are selected from the window W if a home page concerning a favorite musical band of the user is found as shown in the figure, a file for trial listing is downloaded from the Web page so that the user can listen to a part of a music.

Figure 6:
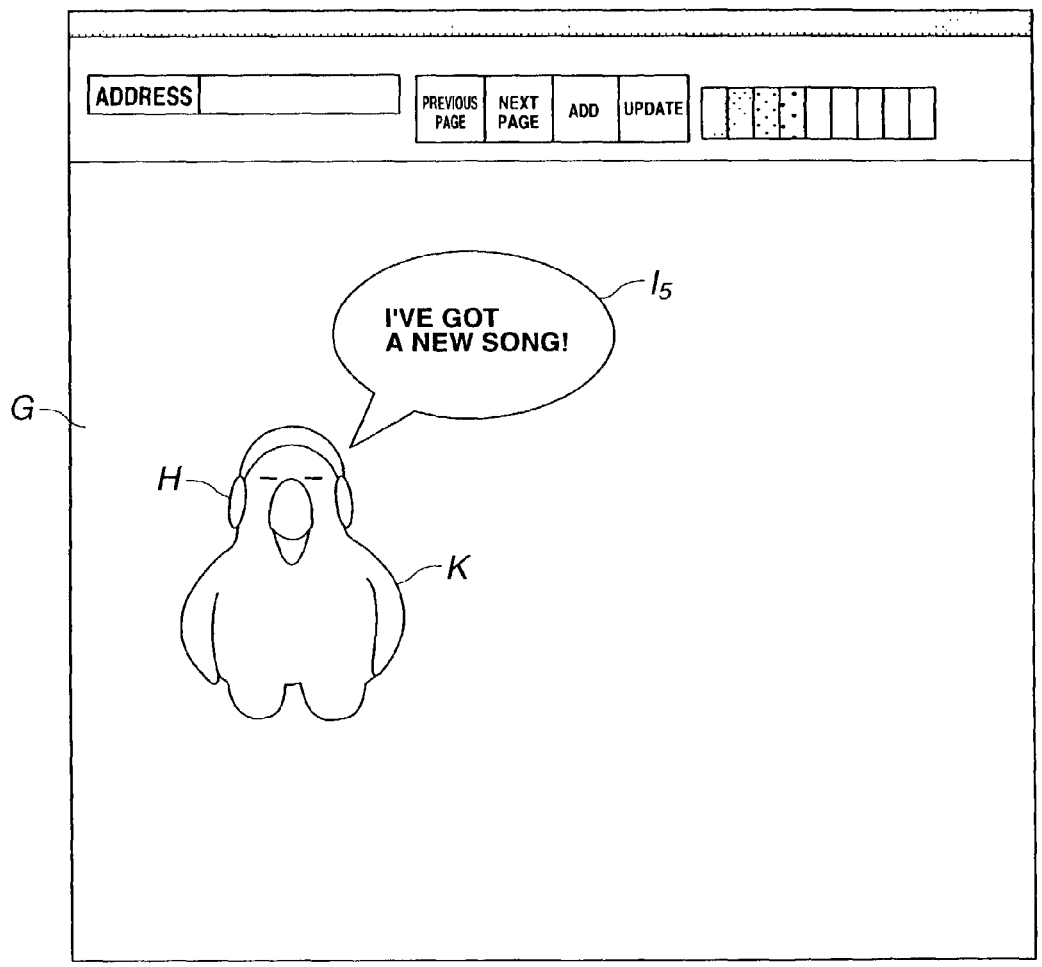
FIG. 6 is a view showing an example of a display form of a character.

As described above, in case of trial listening or in case where a new song is introduced as update information of a home page, the character K is displayed in the form that it is listening to music, as a display form related to selected information, as shown in FIG. 6. In the case of this example, the character is displayed with a head phone H on, on the display screen G.

In this manner, the user can feel as if the user enjoyed music together with the character. To notify update of information concerning new songs, the user can be invited to try listening by the form of the character K shown in FIG. 6.

Thus, in the agent system 21 to which the present invention, the character K drawn on the basis of a drawing system 36 provides information, in forms according to the contents of information. Therefore, users can immediately distinguish the field to which the information belongs to.

As shown in FIGS. 7 and 9, the agent system 21 to which the present invention is applied is stationed in the user computer 1 as an information communication device in the user side and compiles user profiles and user information in the side of the user computer 1. The character is displayed on the basis of data of a knowledge data base 26, and the present state of the character is stored in a character state storage part 32. Every time the display form of the character changes, the data in the character state storage part 32 is changed. The same structure as described above may be constructed in the side of the server, in place of the information communication apparatus in the user side. In this case, for example, it is possible to user a method such as ASP (Application Service Provider) or the like.

In response to a question from the character, user information is obtained from an answer obtained by an input from the user, an input item in the input form for Web connection, or the like, and is stored into an attribute information storage part 29 provided in a storage device (e.g., HDD, PROM, or the like). In addition, key words are created from user information. Based on these key words, information search is carried out so that users are provided with information or predetermined Web pages are connected.

(Hardware Structure in the Side of the User Computer)

FIG. 8 is a block diagram showing the hardware structure of the user computer 1. The user computer 1 comprises a CPU 11 as a data calculation/control processing device, a RAM 13, a ROM 12, a HDD 14, an EEPROM 15, and the like as storage devices.

The CPU 11 executes various processing in accordance with programs stored in the ROM 12 and HDD 14. The RAM 13 appropriately stores necessary data for the CPU 11 to execute various processing. The EEPROM 15 stores the data, for example the user profile, which needs to remain stored in the CPU 11 after power supply is turned off.

The user computer 1 is also provided with a mouse 1$a$ and a keyboard 1$b$ as an input part, a microphone 1$c$ for voice input, a display device 1$d$ such as a monitor or the like, a speaker 1$e$ for voice output, a storage medium 1$f$, a communication device 1$h$ for connecting to a communication line network 2 such as the Internet, a converter 1$i$ or the like for conversion of voice into text data, and the like, which are devices controlled by the CPU 11. These devices are controlled by the CPU 11 through a bus 1$j$ and an interface 1$k$.

Note that the storage medium 1$f$ is constructed by an external hard disc, magneto-optical disc, CD-R, DVD, memory card, or the like. The storage medium 1$f$ is arranged such that data in the user computer 1 can be stored or data in the storage medium 1$f$ can be read from the user computer 1.

Also, the data in the user computer 1 can be shared with a mobile terminal 1$g$. The category of the mobile terminal 1$g$ includes electronic notebook-type portable information tools, portable game machines, and mobile telephones, and further includes portable terminals dedicated to an agent system to which the present invention is applied.

Since data in the user computer 1 can thus be shared with the mobile terminal 1$g$, the user can use the agent system 21 wherever the user go. Accordingly, continuous compilation of user information and timely obtaining of information can be achieved.

At this time, there is a premise that at least a program for displaying a character on the screen and a control part such as a CPU or the like for performing processing based on the program are provided in the side of the mobile terminal 1$g$.

Further, if an enough capacity is left in the side of the mobile terminal 1g, there should be provided a storage part for storing data for making the character speak predetermined words and inputted data.

By this structure, communication between the character and the user can be achieved at the place where the user goes. The data compiled in the mobile terminal 1g at the place where the user goes is outputted to the user computer 1 from the mobile terminal 1g, by connecting the mobile terminal 1g and the user computer 1 when the user gets home.

In addition to subsidiary use of the mobile terminal 1g, as described above, it is possible to adopt a structure in which the mobile terminal 1g is let have all functions of the agent system 21 so that the mobile terminal 1g solely practices the agent system 21 to which the present invention is applied.

In case where the agent system 21 to which the present invention is applied is practiced solely by the mobile terminal 1g, a structure in which the mobile terminal 1g is provided with the CPU 11, ROM 12, RAM 13, EEPROM 15, and storage part, as the hardware structure shown in FIG. 8. As the storage part, for example, a memory card or the like can be used in addition to the internal memory in the mobile terminal 1g.

As the mobile terminal 1g, an electronic notebook type portable information tool, a mobile telephone, or the like is used, and the method of inputting texts and the method of displaying the character differ depending on the structure of the mobile terminal 1g. For example, the case of using an electronic notebook type portable information tool as the mobile terminal 1g is substantially similar to the case of using the user computer 1. A mouse 1a or a keyboard 1b can be used as an input means, and a microphone or a speaker integrally provided in the mobile terminal 1g can be used. In addition, since a display means is provided, the character can be displayed by the display means.

Also, in case of using a portable telephone as the mobile terminal 1g, push buttons can be used as means for inputting texts, or voice input can be achieved by using a transmitter part. In case where buttons or a dial for searching a communication target or for making set-up is provided, these buttons or dial may be used as an input means. Further, the structure may be arranged such that the character is displayed on the display screen which normally displays the telephone number of the communication target.

If a portable phone is thus used as the mobile terminal 1g, user information can be compiled, or the server 3 can be connected only by the single body of the portable phone. Thus, the agent system 21 can be used without occupying a large space or selecting a place.

When a user carries a portable phone, the power source of the portable phone is usually on. For example, when a push button 1 is pressed, the character displays a conversation or question.

The structure may be arranged such that if the user presses the push button 1 at this time, the portable phone is automatically connected to the server 3, collect weather information from the server 3, and provides the information for the user through the character. Alternatively, the structure may be such that the character asks the user if the server 3 may be connected or not, and the connection may then be made. Alternatively, the structure may be such that the server 3 is not connected unless the user makes an independent action to connect the server 3.

The user answers questions from the character or enjoys a conversation with the character with use of push buttons. A key word specific to the user is created from input information from the user and is stored into the storage part. While the user connects the portable phone to the server 3, information is collected from the server 3 and favorite Web pages and is supplied to the user.

Not only the information from the server 3 and web pages, but also information previously stored in the agent system 21 may be searched for and presented to the user, from words inputted through conversations between the user and the character.

(Structure of Agent System)

Explained next will be the system structure of the agent system 21 provided in the user computer 1. The agent system 21 to which the present invention is applied is constructed such that a character as a virtual creature is displayed on a display part 1d of a user computer 1 or a mobile terminal 1g, user information is compiled through conversation with this character, information which complies with the user is obtained and supplied from the side of the server 3 on the basis of the compiled user information, and web pages suitable for the user are introduced.

The agent system 21 is stationed in the side of the user computer 1. As shown in FIG. 9, the agent system 21 comprises an agent program 22 which controls the will and actions of the character, a knowledge data base 26 which stores information concerning the forms of the character, a character state storage part 32 which temporarily holds the present inner state, outer state, and environmental information of the character, a drawing system 36 which generates display data of the character, and a voice generation system 37 which outputs voice of the character.

The agent system 21 is normally constructed such that the system starts operating when the power source of the user computer 1 is turned on. The structure may be arranged such that the timing at which the agent system 21 starts up can be appropriately set from the user side.

In the agent system 21 to which the present invention is applied, the structure is arranged as follows. That is, an agent program 22 is stored in the HDD 14, continuous monitor program data is collected from the agent program 22 and is took in the RAM 13, and the continuous monitor program performs calculation processing between the RAM 13 and the CPU 11.

Therefore, even in a state in which no character is displayed on the display device 1d (i.e., the agent program is not executed), execution history of the user can be obtained as continuous log data of the user.

The agent program 22 controls will and action of the character, based on the knowledge information of the character given by the knowledge data base 26 and the inner state, outer state, and environmental information of the character which are stored in the character state storage part 32, and stores the control results in the character state storage part 32.

By the agent program 22, such a character can be constructed that can autonomously act on the display device Id of the user computer 1. The number of characters that are displayed with respect to one character system is not always limited to one but plural characters may be displayed. In addition, the characters which display information may be used differently depending on the contents of information.

The agent program 22 comprises an information collection part 23, an information analysis part 24, and an information providing part 25. The information collection part 23 collects user information and also collects information sent to users from the server 3. Note that user information is stored into the attribute information storage part 29 and information sent from the server 3 is stored into a provided-information storage part 31.

The information collection part 23 not only collects user information but also obtains server information and information from web pages, based on key words generated by the information analysis part 24 which will be described next. The server information and information from web pages can be collected when the user computer 1 is on line.

From the user computer 1, a key word specific to the user is sent to the side of the server 3. In the side of the server 3, information which complies with the key word is detected and supplied to the user. The information collection part 23 stores information provided from the side of the server 3, into the provided-information storage part 31.

As information detected in the side of the server 3, information stored in the information storage part of the server 3 and information from web pages which comply with the needs from the user are detected. As the information from the Web pages, if an instruction for downloading predetermined information has been made from the user, predetermined information of web pages is downloaded and provided for the user computer 1, in addition to the addresses of the Web pages.

The information analysis part 24 analyzes favorites and tastes of the user, based on user information obtained by the information collection part 23, and generates a key word. Specifically, the information analysis part 24 reads user information and program data of the agent program 22 stored previously in the HDD 14, into the RAM 13, and then performs calculation processing with the CPU 11. Thus, tastes of the user are thus analyzed and a key word is generated. The key word is stored into the key word storage part 29b which will be described later.

The information providing part 25 selects information for the user and determines the outer appearance and action of the character. That is, the information providing part 25 determines what face the character should take when presenting information or what costume the character should put on, based on common rules of the knowledge data base 26 which will be described next.

The state information of the character, as an information providing form of the character which is determined by the information providing part 25, is sent to the character state storage part 32 which will be described next. The internal data of the character state storage part 32 is thus updated.

In addition, the information providing state determined by the information providing part 25 is inputted to the drawing system 36 and the voice generation system 37, which will be described next. Based on the information providing state determined by the information providing part 25, image and voice are generated in accordance with behavior of the character.

The knowledge data base 26 is stored previously in a storage device such as a HDD 14 or the like. The knowledge data base 26 stores data concerning the habits of the character, attribute information of the user, various key word data, and data concerning information provided for the user, e.g., how the character behaves in what situation, what sound the character creates, and the like.

As shown in FIG. 9, the knowledge data base 26 is provided with a common rule storage part 27, a special rule storage part 28, an attribute information storage part 29, and a provided-information storage part 31.

The common rule storage part 27 stores common data concerning the character. For example, this part stores data for setting faces of the character, costumes thereof, ways of moving its body, voice generation, reactions to actions of the user and devices, and the like.

In the common rule storage part 27, a memory map 27a is created with respect to data which determines the display form of the character. The memory map 27a is constructed so as to record "action", "expression", "face", and the like at predetermined addresses in the user area, as shown in FIG. 10. Data is read from these recorded addresses, and various forms depending respectively on categories, such as, ways of moving the body, voice generations, and reactions, are expressed.

For example, with respect to the faces of the character, data concerning a smile as a face 1, an angry face as a face 2, a sad face as a face 3, a calm face as a face 4, an impressed face as a face 5, a neutral face which does not particularly express a feeling as a face 6 are stored.

With respect to costumes of the character, an appearance with an umbrella as an expression 1, data concerning an appearance with a sun glass as an expression 2, an appearance with a head phone as an expression 3, an appearance with a uniform as an expression 4, an appearance of having a meal as an expression 5, an appearance with a personal computer as an expression 6, and the like are stored. Data for displaying other various appearances are also stored.

With respect to actions of the character, data expressing actions, such as a form of standing as an action 1, a form of dancing as an action 2, a form of folding arms as an action 3, a form of walking around as an action 4, a form of skipping as an action 5, and the like, are stored.

Every time information is provided, data from the memory map 27a is selected to match the form of the character with the information when information is provided for a user.

The special rule storage part 28 stores rules specific to the user which move the character. For example, appearance frequency at which the character appears on the screen, question frequency at which questions are given to the user, the number of characters displayed by the character system, types of character voice, types of characters (e.g., creature from outer space, animal, plant, robot, and the like) are set in the part 28.

Also, for example, whether a "frame" should be displayed or not when the character speaks, how fast the speed of text display should be in case of displaying a "frame", what should be the display language and input language, whether the voice output should be of stereo or monaural, and the like are set in the special rule storage part 28, so that the user can easily use the system.

The attribute information storage part 29 is provided with a user profile storage part 29a which stores user profiles as attribute information of a user, and a key word storage part 29b which stores key words prepared on the basis of user information.

As described above, the user profile storage part 29a stores individual information of a user, as the user profile, e.g., the address, birthday, sex, occupation, favorite food, color, season, family, birthdays of family members, hobby, lifestyle, and the like of the user.

As described above, the key word storage part 29b stores key words created from input data inputted to an input form, such as an answer to a question to the user or a questionnaire at the time of connecting Internet or the like.

With respect to the information capacity that can be stored in the attribute information storage part 29, a predetermined size is previously set. When the set capacity is exceeded, information of an older date is subjected to overflow deletion while newest information is stored, with priority, into the attribute information storage part 29. Of the created key words, those are not necessary can be deleted properly. However, the user profile may be protected since only less changes are made to the user profile.

Registration of the user profile to the special rule storage part 28 and the user profile storage part 29a of the attribute information storage part 29 is made at the time of installing a program or at the first time of staring the program.

The provided-information storage part 31 stores information obtained from the server 3 by the information collection part 23 of the agent program 22, and information provided for the user, such as contents of questions to the user, responses in conversation with the user, casual chat, information concerning wits of life, information of various subjects, and the like.

Information to be stored in the provided-information storage part 31 will be cited in the next table. Also, information to be provided for the user is stored, classified as shown in the next table. By thus classifying information, information search time can be shortened preferably.

TABLE 1

| CLASS | CONTENTS |
| --- | --- |
| music/ entertainment | karaoke, club, personal computer, game, cinema, art, comic, animation, literature, literary, traditional art, drama, science, TV, GO, SHOGI, camera, video, car, motorcycle, J-POP, ROCK & POPS, DANCE & SOUL, JAZZ, CLASSIC |
| outdoor/ sports | ski, snowboard, soccer, motor sports, marine sports, horse race, golf, baseball, tennis, sumou, fight, martial arts, amusement park, theme park, beach information, domestic tour, overseas tour, spa, pleasure resort, drive, touring, auto-camp, fishing, hiking, crimbing |
| home/life | gourmet, make-up, fashion, gardening, pet, residence, interior, diet, esthetique, child care, education, love, marriage, cooking, money management, lottery |
| city/town life information | trend spot, shopping, entertainment, rumour, extra information, new business information, fashion, trend, scandals, social problems, documentary |

The character state storage part 32 stores the states of the character which change sequentially due to elapse of time and occurrences of events. Of these states, inner parameters such as feelings, hunger, and curiosities of the character (which cannot understood from another character) are stored into the inner state storage part 33.

Also, outer parameters such as the position, direction, and color of the character which can be understood from another character) are stored into the outer state storage part 34. Further, parameters which express the physical environment surrounding the character (temperature, gravity, date, and the like) are stored into the environmental information storage part 35.

Information stored in the environmental storage part 35 is read from the server 3. For example, the information will be weather information (rainy, sunny, hot, cold, or so), news (earthquake has taken place, a big event has occurred, or so), entertainment news (a famous talent has been engaged, new song information, or so).

At this time, with respect to weather information, it would be more preferable to provide weather information which complies with the region where the user lives, based on the address of the user inputted as a user profile, because the information then becomes more valuable.

The drawing system 36 generates display data of the will, action, and the like of the character which are determined by the agent program 22, e.g., changing the face, changing the costume, moving hands and legs, move the mouth in compliance with a conversation, making a pseudo form, or the like.

The voice generation system 37 generates voice data with respect to conversations and questions based on the will and action of the character. These data are outputted as output data to a speaker. In addition, since the agent system 21 to which the present invention is applied is provided with a communication control part 16, an application program for automatic dial-up can be previously installed in the HDD 14. In this manner, text data presented by the character can be converted into voice information by the converter 22. It can seem as if the character dialed up the user on the portable phone of the user and made a conversation based on voice.

Explained next will be information processing in the agent system 21 to which the present invention is applied.

Obtaining user information in the agent system 21 to which the present invention is applied is carried out as follows. At first, a user profiled is inputted at the time of installing the agent system 21.

Inputted as the user profile is individual information of the user, such as the address of the user, birthday, sex, occupation, favorite food, color, season, family, birthdays of members of the family, hobby, lifestyle, and the like.

To grasp the interest target or the like of the user which changes at any time, timely user information is obtained. The user information is obtained through conversation with the character.

For example, at every predetermined time, various questions are given to the user from the character. Although the character gives various questions, these questions are stored as data in the provided-information storage part 31. At this time, according to the characteristics of the present invention, the display form of the character is changed in compliance with the contents of the information provided to the user. When a question is given from the character, predetermined question data is selected from the provided-information storage part 31 by the information providing part 25 of the agent program 22.

Also, the information providing part 25 determines the display form when the character gives the question. Once the display form is determined, data for displaying the character is selected from the common rule storage part 27 and the data in the character state storage part 32 is updated.

That is, when a question is given from the character to the user, the following operation is carried out by the user computer 1. At first, predetermined question data is selected from the provided information in the provided information storage part 31, stored in the HDD 14, and the selected question data is read into the RAM 13.

Next, the CPU 11 determines what field the question data read into the RAM 13 belongs to. According to the determination result, display data of the character, which is stored in the HDD 14, is read into the RAM 13.

At this time, the RAM 13 (character state storage part 32) includes other character display data which has been used for the display form before the question is made, and this data is updated by the character display data for question which is newly read.

The CPU 11 lets the display device 1d display the character in a questioning appearance, and the contents of the question in a frame displayed near the character, based on the question data read into the RAM 13 and the character display data. At this time, for example, the character is displayed to appear with a placard of a mark.

As a specific question, "Do you like music?" is asked at first. If "Yes" is answered, another question such as "Who is your favorite artist?" is then given.

Alternatively, if "Yes" is answered to a question like "Do you like sports?", a question such as "What sport do you like, for example?" or so is then given.

The answers to the questions are user information. Based on the user information, key words are created in the information analysis part 24. For example, "~band" as the name of a favorite artist and "Baseball" as a favorite sport are registered as key words.

In addition to the questions given to the user, targets of the interest of the user are extracted, based on appropriate chats between the user and the character. For example, if a user gives a talk saying that "I went to movie", a key word of "cinema" is created based on this information.

Also, key words are created not only from information inputted by the user but also from information obtained from the server 3, which should be provided for the user. For example, if artist information is provided for the user and if the provided information includes a repeatedly used word (e.g., hard rock, R&B, ballade, or the like), the information analysis part 24 automatically registers a word which was used repeatedly three times, as a key word.

Thus, a key word (hard rock or the like) is created from one key word (e.g., the name of a predetermined artist in this case), so that the user can obtain information of wide variation.

(Hardware Structure in Side of Server and System Structure)

Explained next will be the hardware structure in the side of the server and the system structure.

The agent system 21 to which the present invention is applied is provided in the side of the user computer 1. Collection of user information, control on providing of information for a user by a character, creation of key words for searching for information, and the like are all carried out in the side of the computer 1. However, information search operation based on key words is carried out in the side of the server 3. Of course, the collection of user information, control on providing of information for a user by a character, creation of key words for searching for information, and the like may be carried out in the side of the server 3.

Therefore, the server 3 according to the present embodiment comprises at least a CPU 3a as a calculation/control device for data, a RAM 3b and a HDD 3c as storage devices, and an information search program 3d.

FIG. 11 is a block diagram showing the structure of the server 3. The server 3 comprises an information storage part 3e which stores information to be provided for the user, and a transmission/reception part 3f which exchanges data with the user computer 1 or other web servers.

The information storage part 3e is provided in the HDD 3c, for example, The storage part 3e is subjected to maintenance by the manager of the server 3 in order that newest information is always stored.

In the server 3, whether corresponding data exists in the information storage part 3e or not is searched, based on a key word accepted by the transmission/reception part 3f. That is, the key word is read on the RAM 3b, and the key word on the RAM 3b and information data stored in the HDD 3c are compared with each other by the CPU 3a.

Further, the server 3 searches whether a corresponding web page exists or not, based on the key word. In this case, the structure may be arranged such that information from web pages are registered in the information storage part 3e of the server 3. Alternatively, the structure may be arranged such that another search engine site is accessed from the server 3 and web page search is carried out the another search engine site.

According to the structure as described above, if information which complies with a key word is detected, the information is transmitted from the transmission/reception part 3f to the user computer 1.

(Information Search)

Explained next will be information search in the side of the server 3, based on a key word sent from the user computer 1. When channel connection is achieved by a user to make the user computer 1 on line or when the user computer 1 is made on line at a time set previously by a timer or the like, transmission/reception of information to/from the server is enabled. At this time, the information collection part 23 transmits a predetermined key word to the server 3 through a communication channel network 2.

The server 3 receives the key word sent from the user computer 1 by the key word reception part 3a. The server 3 searches information which complies with the key word from various information stored in the information storage part 3b in the side of the server, to select information to be provided for the user.

The selected server information is sent from the information transmission part 3c to the user computer 1. This information is received by the information collection part 23 of the user computer 1 through the communication channel network 2 and is stored into the provided-information storage part 31.

In order to provide the user with information stored in the provided-information storage part 31 through a character, the display form of the character is determined in compliance with the contents of the information to be provided.

The information providing part 25 reads data from the memory map 27a of the common rule storage part 27 in accordance with predetermined rules, in order to determine the display form of the character. For example, in case of information concerning weather, it is predetermined that information is provided in a situation that the character stands. In case where it rains, it is predetermined that the character appears with an umbrella and the face of the character is sad.

In case of information concerning music, as shown in FIG. 6, the face 5 of the "impressed face", the expression 3 "with a head phone", and the action 1 of "standing" are selected as display data of the character.

At this time, as the data which determines the display form of the character is subdivided more, the character can be displayed with richer faces. For example, if information relates to one specific artist in case of information concerning music as described above, there is provided data for making the character wear a costume specific to the artist.

In this manner, when the user receives provided information, the user can know not only what the field of the information is but also which artist the information is related to in case of information concerning music or what sport information is related to in case of information concerning sports.

For example, information concerning a musical artist, the character appears on the display screen, expressing a form specific to the artist (e.g., carrying a guitar, handling a microphone in a special way, riding or dancing on a special rhythm, or so).

Thus, according to the present invention, the character provides information, in a display form associated with the information to be provided. Therefore, the user can intuitively grasp what the information is related to, by merely watching the display form of the character.

In addition to the above-described case in which information is autonomously provided from the side of the agent system 21 to the user, a predetermined search word is instructed so that information can be obtained when the side of the user desires it like conventional cases, of course.

Key words are not limited to words but addresses of web pages can be registered as key words, e.g., by registering the web page as a favorite when information from a predetermined web page is presented as information to be provided for the user.

By thus registering addresses of web pages as key words, web pages registered as favorites can automatically be accessed every time the communication channel network 2 is connected, and update information thereof can be presented as provided information if any of the web pages is updated.

Update information of the web page can be obtained as follows, for example.

At first, when a channel is connected by the user and the user computer 1 is set on line or when the user computer 1 is set on line at a time previously set by a timer or the like, the information collection part 23 transmits an addresses of a favorite web page to the server 3 through the communication channel network 2.

The server 3 accesses the web server which discloses the web page from this address, and requests the web server to transfer header information of the web page or file data of the web page.

The header information includes information concerning communication protocols and status information of communication and also includes information of update date/time of the file. The server 3 transfers this header information to the user computer 1.

The user computer 1 confirms whether or not the web page has been updated, based on the header information transmitted from the server 3. Therefore, when the web page is opened and read in the user computer 1, the title of the web page and the header information are coupled and stored into the provided information storage part 31, the header information of the provided information storage part 31 and the header information transmitted from the server 3 are compared with each other.

If no header information can be obtained, the file of the web page is transmitted to the server 3. The server 3 transmits information concerning a time stamp from the transmitted file to user computer 1.

The user computer 1 confirms whether the web page has been updated or not, based on the time stamp information transmitted from the server 3. Therefore, the user computer 1 should preferably be constructed such that the title of the web page and the time stamp information are coupled and stored into the provided information storage part 31, when the web page is opened and read, and the time stamp information of the provided information storage part 31 and the time stamp information transmitted from the server 3 are compared with each other.

In the user computer 1, the CPU 11 reads header information or time stamp information used at the time of last reading, onto the RAM 13 from the HDD 14 which is provided with the provided information storage part 31. The CPU 11 also reads new header information or time stamp information received from the server 3, onto the RAM 13, thereby to compare new and last information.

As a result of the comparison, if the new header information or the time stamp information has been changed, i.e., if the update date/time has been changed, the CPU 11 determines that the web page has been updated and notifies the user of the information.

Also, in case where update information of the web page is notified to the user through a character, the same processing is performed as that of normally providing information. The CPU 11 selects the face 1 "smile", expression 6 "with a personal computer", and action 1 "standing", from the memory map 27a of the common rule storage part 27 existing in the HDD, and displays the character, based on these display data.

In addition, the CPU 11 lets the character to speak so that the user is invited to access the home page. That is, the CPU 11 selects from the provided information storage part 31 in the HDD 14, a fixed sentence saying that "The page of ○○ seems to have been updated! Let's go and see!" which should be said from the character when the web page is updated. The title of the web page is inserted in the part of ○○"" and is displayed in a frame of the character.

At this time, the structure may be arranged such that not only access to the updated home page is invited but also the home page can be opened and read after whether or not the information which the user wants to know most is checked.

For example, as shown in FIG. 3, when update of a home page is notified by the character K, a question asking "Will you go to see?" is made then. In the side of the user, either of "Yes/No" is selected. If "Yes" is selected, a question asking "Is there any particular item you want to see?" is then given from the character.

If there is a particular item which the user wants to see, the user selects "Yes". Then, top page data of the home page, the top page data of the update file, or the update file is downloaded together to the user computer 1 at once, and is stored into the provided information storage part 31.

Next, the character asks "what do you want to see?", and the user inputs "present". Then, as shown in FIG. 4, the character says "What? You can see depending on the present? Please wait for a moment!". In the user computer 1, key words of "prize", "lottery", and the like are created at the information analysis part 24, together with the key word of "present". Further, the information providing part 25 searches data and the like of the top page stored in the provided information storage part 31.

As a result of the search, if there is update information concerning the present, the update information is presented to the user. Otherwise, if there is no new information concerning the present, the fact that no new information exists concerning the present is notified to the user.

As an alternative of the method in which data and the like of the top page are downloaded and search is then carried out in the side of the computer 1, as described above, the structure may be arranged as follows. Update information is previously provided to the side of the server 3 from the side of the web page, and the update information is stored into the information storage part 3e in the side of the server 3. Then, whether or not information desired from the user has been updated is searched in the side of the server 3.

If update check of web pages is carried out periodically, update check is not missed and the user can obtain newest information without missing information. In addition to the update of web pages, whether or not information based on predetermined key words should be periodically provided may be determined. Then, information can be provided for the user at a desired frequency.

Even if the user does not use the user computer 1, information is may be sent by means of a mail or the like when information is provided periodically as described above. Then, obtaining of information is not missed, preferably.

In case of adopting the structure as described above, information provided by the agent system 21 can be obtained everywhere at any time by connecting a mobile terminal 1g to the user computer 1 if the user owns a mobile terminal 1g.

With respect to information of web pages among the provided information, the information collection part 23 of the agent program 22 automatically reads web pages previously and copies data into the storage part of the HDD 14. Then, display waiting time for web pages can be reduced preferably.

Otherwise, when the web page is presented as provided information, the web page may be downloaded together at once into the storage part of the HDD 14 or the like by the information collection part 23 of the agent program 22. In this structure, web pages can be opened and read even off line, the connection fee can be reduced.

Further, when downloading a web page as described above, only data which have a relatively small volume, such as text data and the like, may be downloaded and stored into the provided information storage part 31, omitting video information and the like.

By thus reducing the data volume, downloaded data can be outputted to the mobile terminal 1g such as an electronic notebook type mobile information tool, a portable phone or the like, so the data can be read at places where the user goes.

Explained next will be representative ones of processing to be executed by the agent system 21, in accordance with a flowchart.

(Outline of Processing by Agent System)

Figure 12:
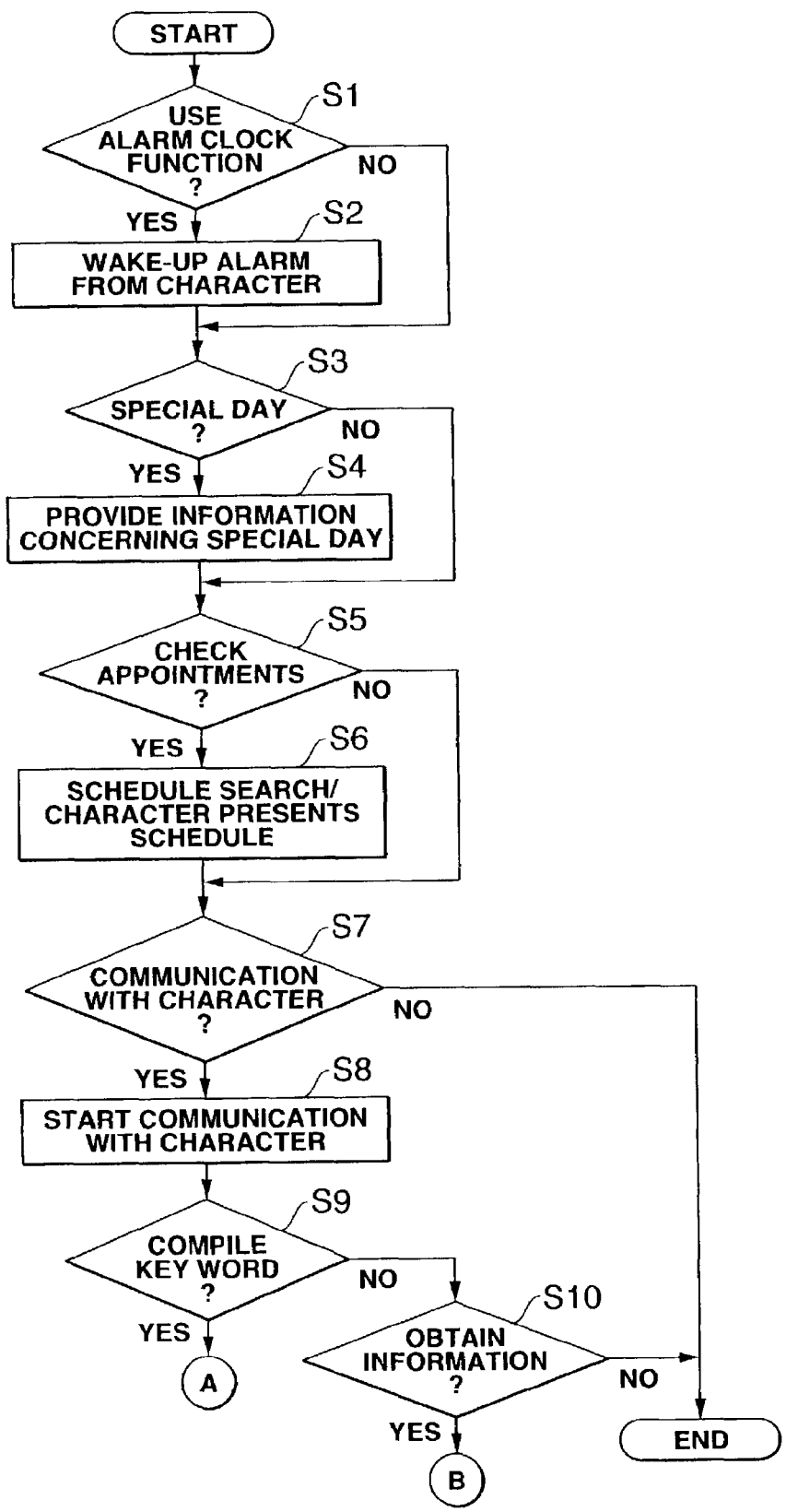
FIG. 12 is a flowchart for explaining processing made by the agent system.

At first, explanation will be made of outline of processing made by the agent system 21 to which the present invention is applied. The flowchart shown in FIG. 12 shows the functions of the agent system 21 to which the present invention is applied, along the time line starting from morning. Each determination step is executed mainly based on input instructions from the user.

In FIG. 12, explanation will be made of a structure in which the agent system 21 is provided with an alarm clock function, a scheduler function, and an anniversary function, in addition to the information providing function. This embodiment will be explained, supposing a case that the agent system 21 was off in the previous day regardless of ON/OFF of the power source of the computer.

At first, if the power source of the computer has been turned on or if the power source is turned on at a predetermined time and the computer starts up, the agent system 21 starts up and determines whether or not the alarm clock function should be used (step S1).

If the alarm clock is used (step S1: Yes), the character notifies the user of that a wake-up time has come, at a predetermined time (step S2). Otherwise, if the alarm clock function is not used (step S1: No), the system goes to next processing.

Subsequently, whether or not today is a special day such as a birthday or the like is determined (step S3). If today is a special day such as a birthday or the like (step S3: Yes), the character displays a message such as "Happy birthday" or so (step S4). In this case, the character has a "birthday cake" or the like and thus appears in a form from which the birthday can be intuitively determined. Otherwise, if today is not a special day (step S3: No). The system goes to next processing and determines whether or not today's schedule should be checked (whether or not appointments should be checked) (step S5).

In case of checking today's schedule (step S5: Yes), the schedule of the user which has been previously inputted is searched and whether or not there is a schedule is notified and the contents of the schedule if any is notified (step S6). In this case, the character has a "schedule table" or the like and thus appears in a form from which it is possible to determine intuitively that information relates to today's schedule.

If today's schedule is not checked (step S5: No), the system goes to next processing and whether or not the user communicates with the character is determined (step S7). If no communication is made with the character (step S7: No), the processing is terminated.

If the user inputs an instruction for communicating with the character (step S7: Yes), communication with the character is started, so conversation between the user and the character begins (step S8).

At this time, to determine what processing is carried out by the communication with the character, whether or not a key word should be created from the communication with the character is determined (step S9).

In case of creating a key word (step S9: Yes), the system goes to key word creation processing (A). Otherwise, if no key word is created (step S9: No), whether or not information should be provided for the user is determined (step S10).

If information is provided for the user (step S10: Yes), the system goes to information providing processing (B). Otherwise, if no information is provided (step S10: No), the processing is terminated.

(Processing A: Key Word Creation Compilation Processing)

Figure 13:
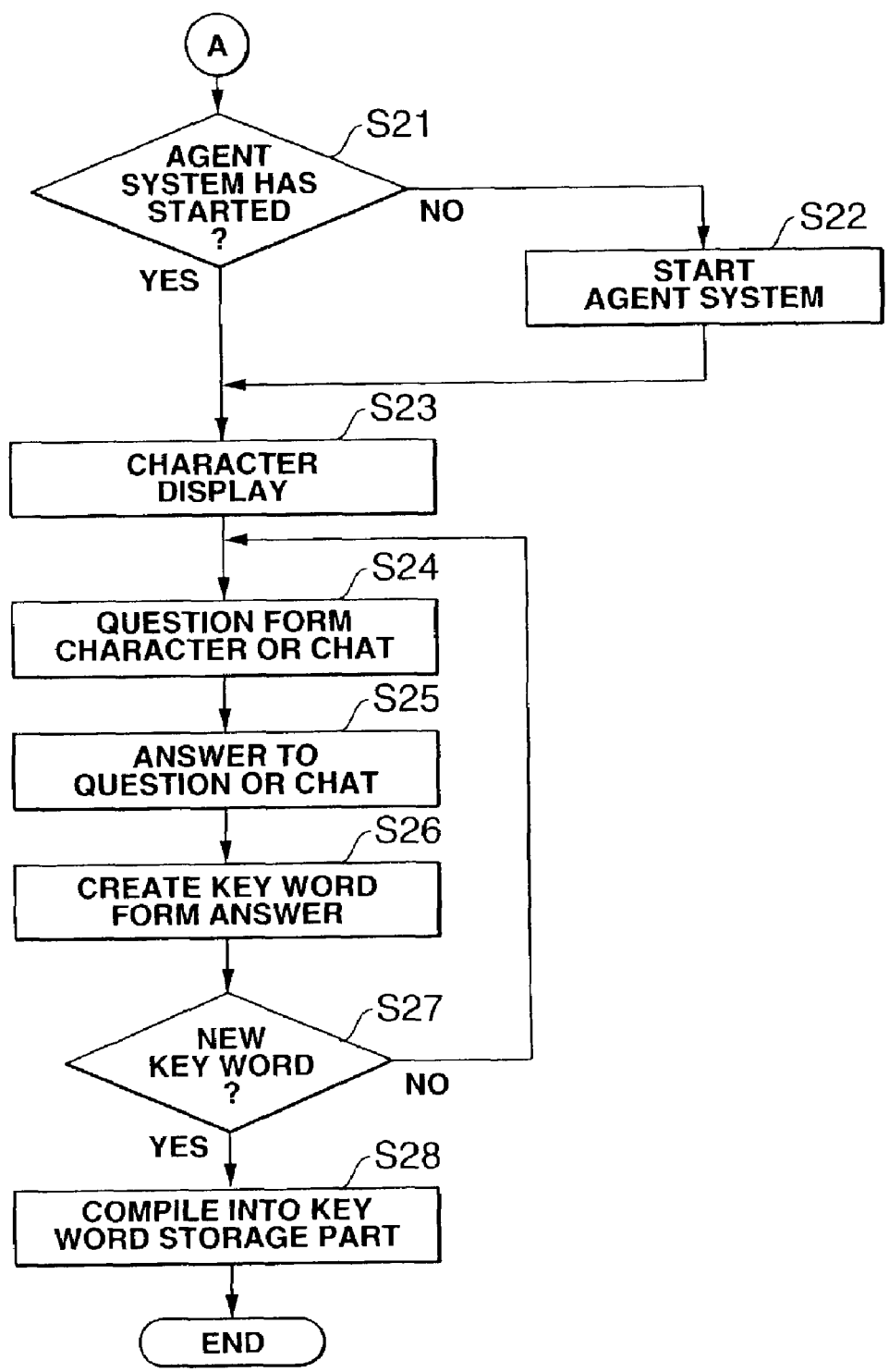
FIG. 13 is a flowchart for explaining key word creation compilation processing based on communication with a character.

Next explanation will be made of processing in which the user and the character communicate with each other thereby to create and store a key word, based on FIG. 13.

At first, whether the agent system 21 has started up or not is determined (step S21). If the agent system 21 has not started up (step S21: No), the agent system is started up (step S22).

The agent system 21 is thus started up, and then, a character is displayed on the display device 1d of the user computer 1 (step S23). The displayed character asks the user a question or makes a chat with the user (step S24).

To the question or chat from the character, the user responds (step S25). This response is information indicating the tendency of the interest of the user. Based on this response, a key word is created by the information analysis part 24 of the agent program 22 (step S26).

At this time, whether or not the created key word is a new key word, i.e., whether or not it is one of those key words that have already been compiled in the key word storage part 29b is determined (step S27).

If it is a new key word (step S27: Yes), the key word is accumulated in the key word storage part 29b (step S28). Otherwise, if it is not a new key word (step S27: No), the processing from the step S24 to the step S27 is repeated until a new key word is created.

(Processing B: Information Providing Processing for User)

Figure 14:
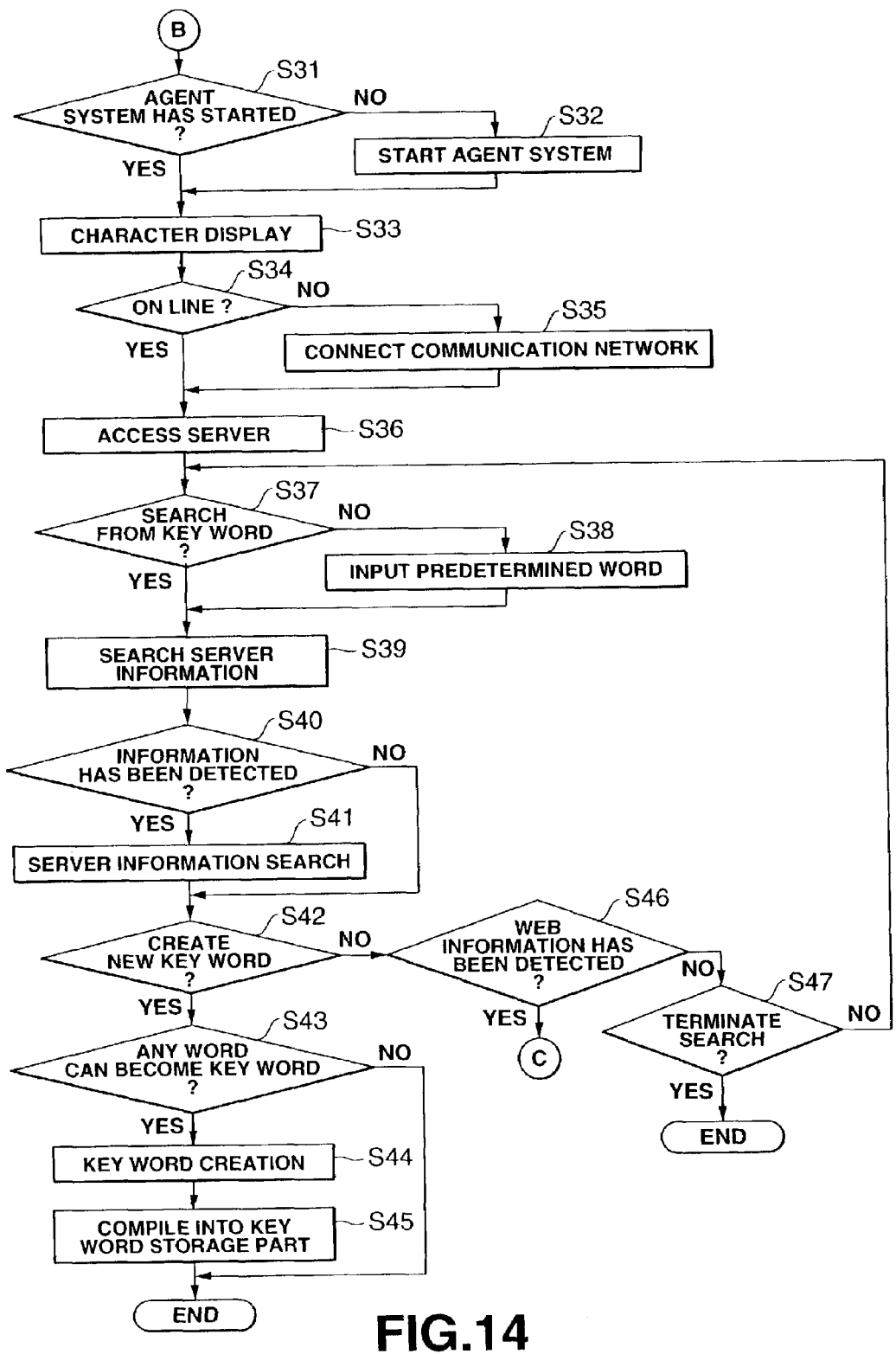
FIG. 14 is a flowchart for explaining server information providing processing for users.

Next information providing processing for user will be explained on the basis of FIG. 14.

At first, whether or not the agent system 21 has started up is determined (step S31). If the agent system 21 has started up (step S31: No), the agent system 21 is started up (step S32).

After the agent system 21 is thus started up, a character is displayed on the display device 1d of the user computer 1 (step S33). Next, whether or not the user computer 1 is on line, i.e., whether or not the user computer is connected to the communication channel network 2 is determined (step S34).

If the user computer is not on line (step S34: No), the communication channel network 2 is connected (step S35). At this time, connection to the communication channel network 2 is carried out at the same time when the agent system 21 starts up. However, the structure may be arranged such that the communication channel network is connected after confirming connection to the user. Alternatively, the structure may be arranged such that the communication channel network 2 is not connected before the user independently connects the communication channel network 2. After the communication channel network 2 is thus connected, the server 3 is accessed through the communication channel network 2 (step S36).

After the server 3 is accessed, whether or not information is searched is determined (step S37). If search is carried out with a key word (step S37: Yes), whether or not there is information which complies with the key word is searched (step S39).

If search from the key word is not carried out (step S37: No), a word concerning information to be searched is inputted (step S38), and whether or not there is information which complies with this word is searched (step S39). This processing is carried out in case where the user side has information which the user wants to search independently.

Next, whether or not the information has been detected is determined (step S40). If the information has been detected, it is provided from the character (step S41). At this time, processing (E) for determining the display form of the character is carried out. This processing causes a display form related to the information to be provided by the character. The processing (E) will be described later.

Next, based on provided server information, whether or not a key word should be created is determined (step S42). If a key word is created (step S42: Yes), the information analysis part 24 determines whether or not the provided server information includes a word which can become a key word (step S43).

For example, if the server information includes a word which repeatedly appears and this word becomes a key word (step S43: Yes), a key word is created (step S44) and is accumulated in the key word storage part 29b (step S45).

If no key word is created (step S42: No), whether or not information concerning a web page has been detected is determined next (step S46). If information concerning the web page has been detected (step S46: Yes), the system goes to processing (C).

If information concerning the web page has not been detected (step S46: No), whether or not the processing should be terminated is determined (step S47). If information search processing is not continued as the user terminates connection to the server 3 or so (step S47: Yes), the processing is terminated. If other information is searched from the server 3 (step S47: No), the processing from the step S37 to the step S46 is repeated.

(Processing C: Information Processing of the Web Page)

Figure 15:
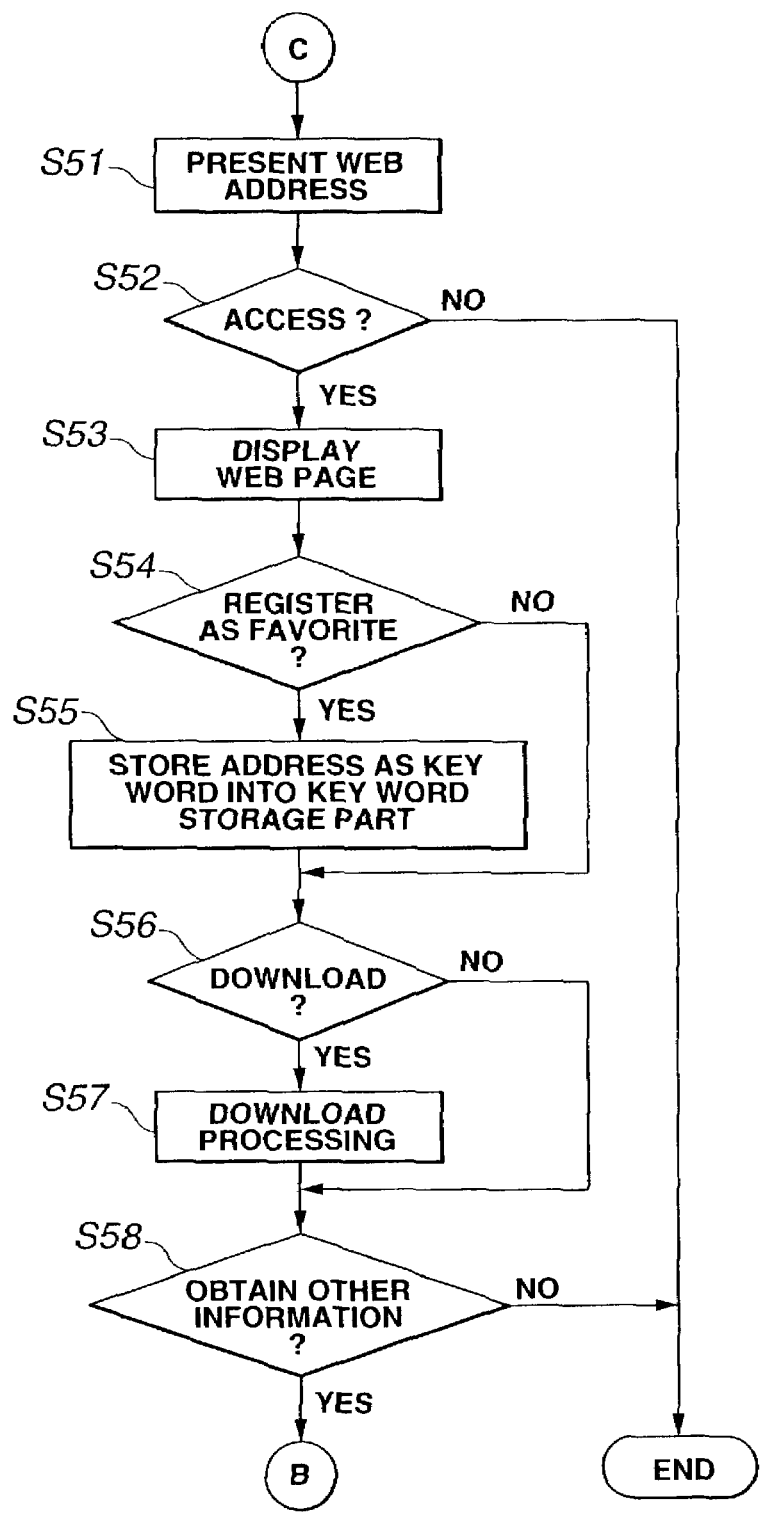
FIG. 15 is a flowchart for explaining information processing on the Web page.

Next explanation will be made on the basis of FIG. 15, with respect to processing when a web page is detected as information to be provided for the user.

At first, the address of the detected web page is presented (step S51). Next, whether or not the web page should be accessed is determined (step S52). At this time, as shown in FIG. 5, the character asks "There are two pages concerning. Will you go?" or so.

If the home page is accessed (step S52: Yes), the web page is displayed (step S53). If it is determined that no web page should be displayed (step S52: No), the processing is terminated.

Next, whether or not the displayed web page should be registered as a favorite is determined (step S54). If it is registered as a favorite (step S54: Yes), the address of the web page is stored in the key word storage part 29b as a key word (step S55).

Further, whether or not the web page should be downloaded is determined (step S56). If it should be downloaded (step S56: Yes), download processing is carried out (step S57).

After the download processing is finished, whether or not other information should be provided is determined (step S58). If other information should be provided (step S58: Yes), the system shifts to information providing processing (B) for the user. Otherwise, if no other information should be provided (step S58: No), the processing is terminated.

If web information is thus obtained, the structure is preferably arranged such that items which are instructed often from the side of the user are displayed on a window, as shown in FIG. 5. For example, if a home page concerning a predetermined band is found as shown in the figure, $P_1$ of "open voice instruction window" and $P_4$ of "trial listing" are selected from the window. In this manner, files for trial listening are downloaded from the web page, and a trial listening file is reproduced in the side of the user computer 1, so that the user can listen to part of the music. The above case is possible where the provider of the web information has data for trial listening.

Alternatively, when no home page is blowsed, $P_2$ of "not display" is selected. In addition, another favorite page ($P_3$ of "Computer term home page" in this case) which has been previously registered may be opened and read, or $P_7$ of "check update" may be selected to check whether or not a favorite page has been updated.

If there is no time to check a web page, the item $P_6$ of "create a take-out pack" may be selected. Then, only data such as text data and the like which have a relatively small volume are downloaded, omitting video information and the like. The downloaded data is outputted to the mobile terminal 1g such as an electronic notebook type mobile information tool, a portable phone, or the like, so that data can be read at places where the user goes.

By selecting the item $P_7$ of "check update", whether or not a previously registered favorite page has been updated can be checked. Further, if the user desires to search other information on the Internet, $P_5$ of "Internet search" is selected.

If setting of the character is changed, $P_8$ of "Advanced Character Options" is selected. To terminate all processing, $P_9$ of "Close" is selected.

(Processing D: Information Providing Processing for User)

Figure 16:
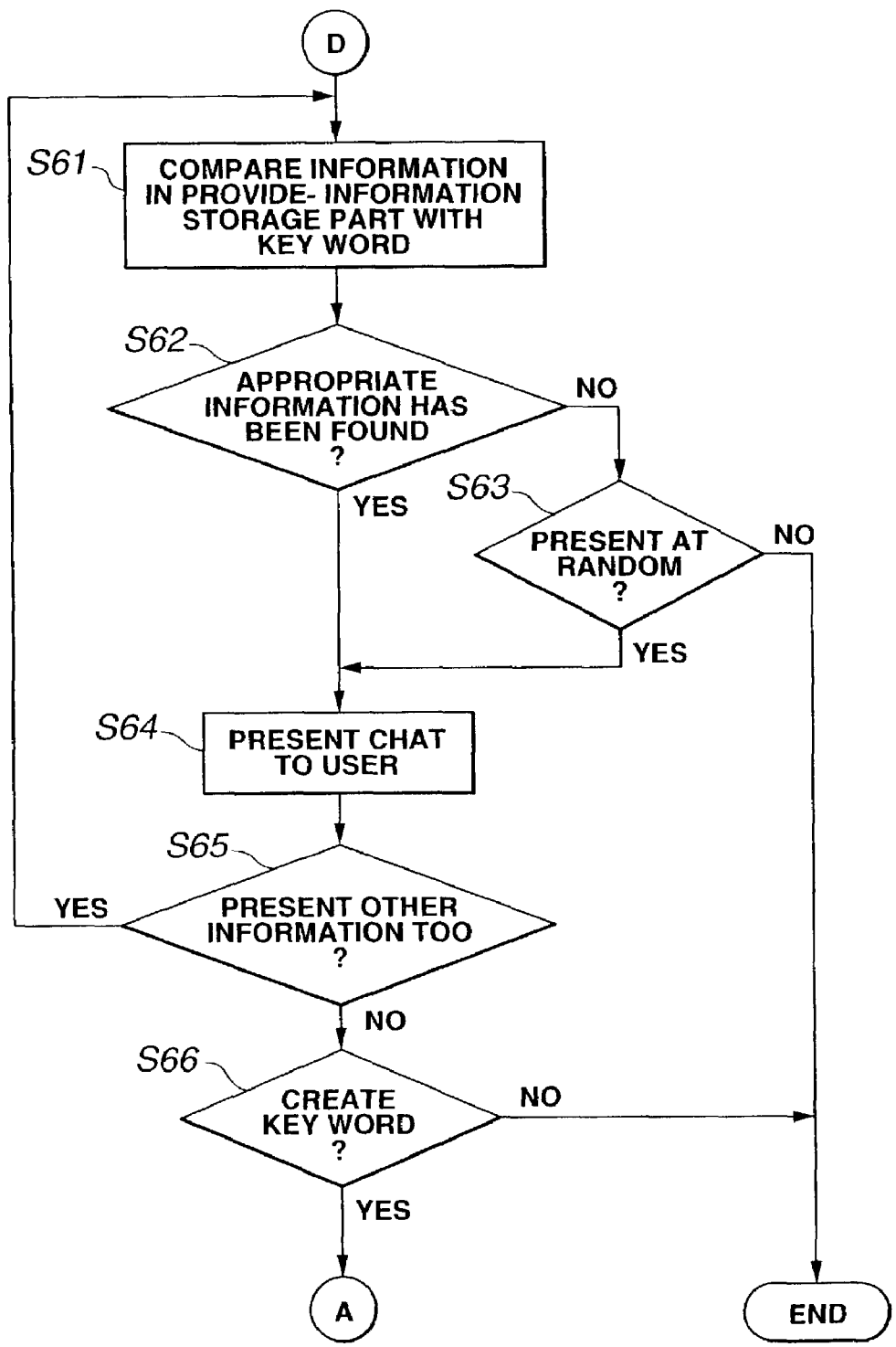
FIG. 16 is a flowchart for explaining information providing processing for users.

Next explanation will be made of processing of providing the user with information stored in the knowledge data base 26 of the agent system 21, based on FIG. 16. This processing is executed in cases where the user communicates with the character off line, key words for searching information to be provided for the user are not sufficiently stored, and the like.

At first, the information stored in the provided information storage part 31 of the knowledge data base 26 and the key word are compared with each other (step S61). The present processing supposes also a case where key words are not stored sufficiently. If there is no appropriate key word, information is searched mainly based on the age, sex, occupation, and the like which belong to the user profile. The structure may also be arranged such that not only the previously stored key words but words inputted through conversation with the character may be directly utilized to search information.

Next, whether or not appropriate information suitable for providing has been found is determined (step S62). If suitable information has been found (step S62: Yes), this information is provided for the user in form of a chat, good news, or the like from the character (step S64).

If no appropriate information suitable for providing has been found (step S62: No), whether or not information should be presented at random is determined (step S63). In case of presenting information at random (step S63: Yes), the system goes to a step S64 and information is provided.

For example, a case that information is not provided at random (step S63: No) is such a case that the user is so aged that the user cannot enjoy the information if it is provided at random. In this case, for example, an individual countermeasure is taken, e.g., information for aged users is sufficiently filled in the provided information storage part 31 by version-up or so.

After information is provided for the user, whether or not other information should further be provided is determined (step S65). When other information is provided (step S65: Yes), the processing from the step S61 to the step S65 is repeated.

Also, whether or not a key word should be created from communication between the user and the character based on provided information is determined (step S66). In case of creating a key word (step S66: Yes), the system shifts to key word creation accumulation processing (A). If no key word should be created (step S66: No), the processing is terminated.

(Processing E-1: Form Processing of Character in Providing Information—1)

Figure 17:
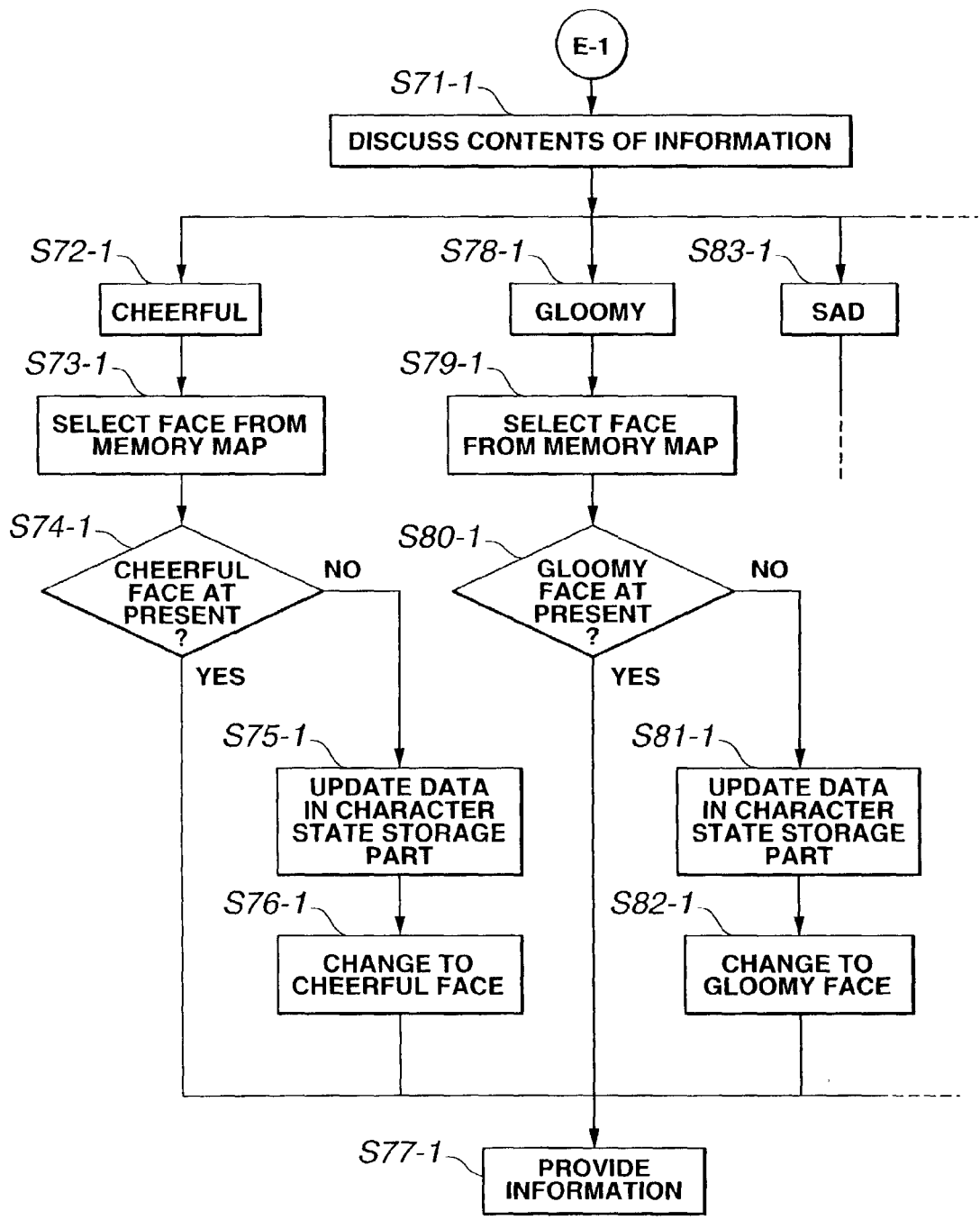
FIG. 17 is a flowchart for explaining character form processing at the time of providing information.
Figure 18:
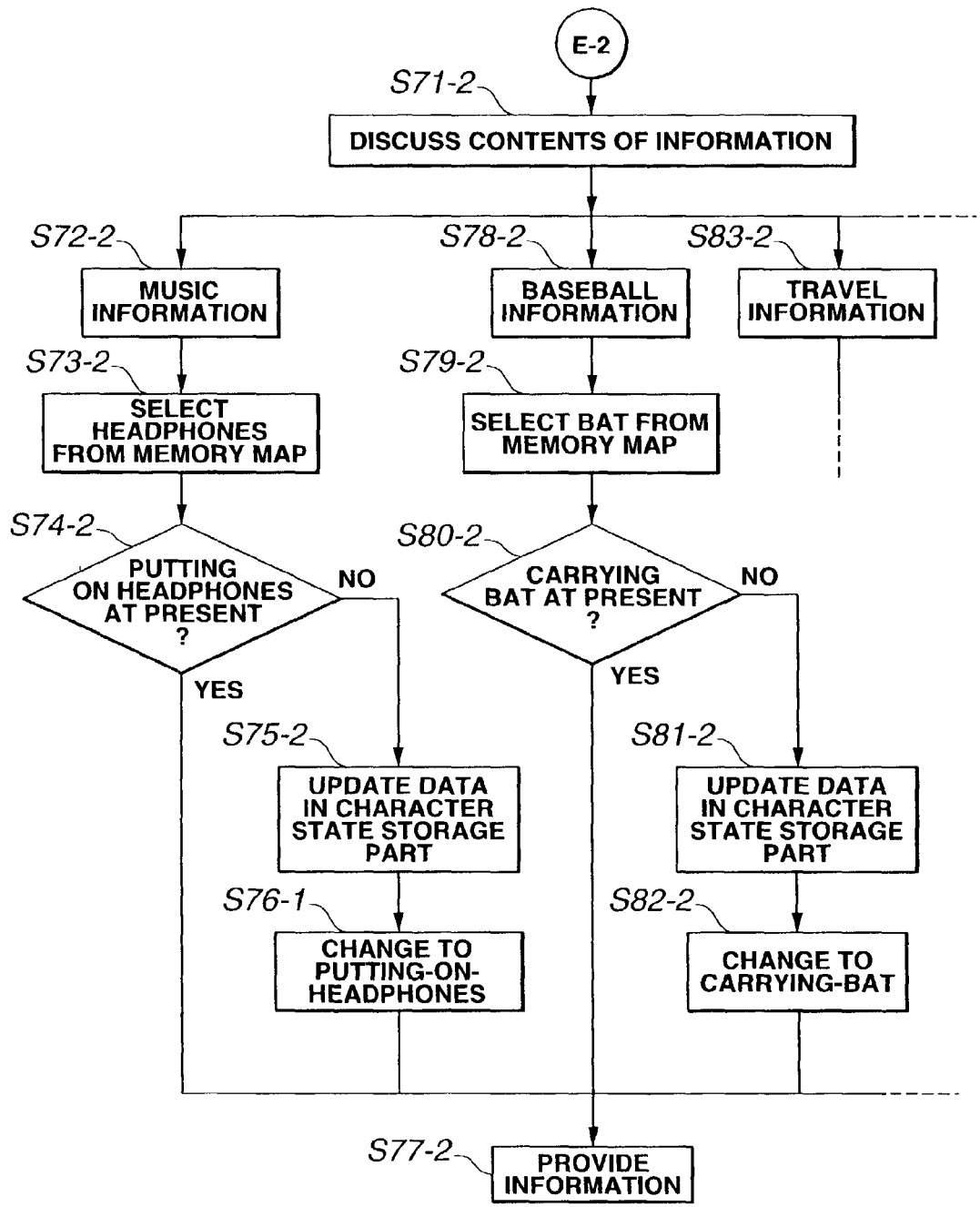
FIG. 18 is a flowchart for explaining character form processing at the time of providing information.

Next, based on FIG. 17, explanation will be made of the form processing for the character when information is provided. The form of the character is determined from the face, costume, and action of the character and properties (tools) which the character carries. Explained now will be the form processing with respect to the face of the character.

At first, the contents of information to be presented are discussed (step S71-1). For example, if it is determined that the information to be provided is cheerful one (step S72-1), data for expressing a cheerful face is selected from the memory map 27*a* (step S73-1).

Next, whether or not the present face of the character is cheerful is determined (step S74-1). If the character presently has a cheerful face (step S74-1: Yes), the character provides information, continuously keeping the cheerful face (step S77-1).

If the present face of the character is not cheerful (step S74-1: No), internal data of the character state storage part 32 is updated by data for expressing a cheerful face, which is read from the memory map 27*a* of the common rule storage part 27 (step S75-1). In this manner, the character is changed from a gloomy face to a cheerful face (step S76-1) and then provides information (step S77-1).

If the information to be provided is determined as including unpleasant contents by discussion on the contents in the step S71-1 (step S78-1), data for expressing a gloomy face is selected from the memory map 27*a* (step S79-1).

Next, whether or not the present face of the character is gloomy is determined (step S80-1). If the character presently has a gloomy face (step S80-1: Yes), the character provides information, keeping the gloomy face (step S77-1).

If the face of the character is cheerful (step S80-1: No), the internal data of the character state storage part 32 is updated by data for expressing a sad face read from the memory map 27*a* of the common rule storage part 27 (step S81-1). In this manner, the character is changed from a cheerful face to a gloomy face (step S82-1), and information is provided (step S77-1).

Further, if the information to be provided is determined as sad contents by discussion on the contents in the step S71-1 (step S83-1), the same processing as described above is carried out so that the information is provided from the character having a sad face. Thus, according to the contents of provided information, the face of the character is changed. The faces of the character include a calm face, an impressed face, an expressionless face, and the like in addition to the cheerful face and the gloomy face as described above. A face which most complies with the contents is selected in accordance with the contents of each information item.

(Processing E-2: Form Processing of Character in Providing Information—2) Next, explanation will be made with reference to FIG. 18 on the processing by which properties (tools) of the character are changed for the contents of information items, respectively.

At first, the contents of the information to be presented is discussed (step S71-2). For example, if it is determined as music information (step S72-2), a head phone is selected from the memory map 27*a* as a property (tool) which indicates music information (step S73-2).

Next, whether or not the character presently puts on a head phone is determined (step S74-2). If the character presently puts on a head phone (step S74-2: Yes), the character provides information, continuously keeping its form (step S77-2).

If the character does not put on a head phone (step S74-2: No), the data in the character state storage part 32 is updated by data for putting a head phone on the character, which is read from the memory map 27*a* of the common rule storage part 27 (step S75-2). In this manner, the character is changed into a form wearing a head phone (step S76-2), and information is provided (step S77-2).

Like the processing described above, for example, if the information to be provided is determined as baseball information by the determination in the step S71-2 (step S78-2), data for making the character have a bat is selected from the memory map 27*a* (step S79-2).

Next, whether or not the character presently has a bat is determined (step S80-2). If the character presently has a bat (step S80-2: Yes), the character provides information, keeping continuously its form (step S77-2).

If the character does not have a bat (step S80-2: No), the internal data of the character state storage part 32 is updated by data for letting the character have a bat, which is read from the memory map 27*a* of the common rule storage part 27 (step S81-2). In this manner, the character is changed into a form with a but (step S82-2), and information is provided (step S77-2).

Further, if information to be provided is determined as travel information by discussion on contents in the step S71-2 (step S83-2), the same processing as described above is carried out, and the information is provided from the character with a travel bag.

The character is expressed in various forms by changing costumes, moving hands and legs, moving the mouth in accordance with conversation, dancing on a rhythm, mimicry, and the like, in addition to the form with a property (tool) as described above. In case where processing becomes heavy if all information items are respectively made forms specific to the information items, different forms are respectively used for those information items that are often provided, and no special form is displayed for those information items that are rarely provided.

Thus, according to information, the character is changed into a display form related with the information. Not only the face, properties, and costume of the character are changed as described above but also the character itself may be changed in accordance with the type of information.

In this case, what characters are used respectively for types of information is predetermined. When information is provided, the contents of the information is discussed, so that the character to be displayed is determined.

For example, newest information is presented by a youthful character. On the other hand, wits of life, health information, or the like is presented by a mature character. The user then can be provided with information without a sense of incongruity.

(Procedure of Key Word Creation)

Next, the key word creation system for selecting information for the user will be explained with reference to FIG. 19.

As shown in FIG. 19, key words are created by the information analysis part 24 of the agent program 22, based on information inputted to the input part 24*a*. This information includes the user profile, answers from the user to questions from the character, data information, input data inputted to input forms such as questionnaires when the Internet is connected, and the like. Information of these kinds for creating key words is inputted to the input part 24*a* of the information analysis part 24.

An answer analysis processing part 24*b* classifies information into fields such as basic information of the user, habits of the user, interest targets of the user, and the like.

As described above, after information is classified, a specific key word is created in the key word generation part 24*c*. The key words are classified into groups 29*c* to 29*e* respectively depending on the fields, and are stored into the key word storage part 29*b* provided in the attribute information storage part 29.

At this time, if key words are ranked in correspondence with importance levels, information can be provided preferably in the order from the most necessary information for the user when information is provided on the basis of key words.

Questions from the character are made repeatedly at predetermined cycles of every week, every month, and the like. Every time a new answer is given, a key word is created and accumulated into the key word storage part 29*b*.

Key words can thus be constantly created with respect to interest targets of the user. Since there is a limitation to the storage capacity of the key word storage part 29*b*, capacities are determined respectively for groups. When key words are compiled up to a capacity, key words may be automatically deleted in the order from the oldest one.

As described above, key words concerning the interest targets of the user are created by daily repeated questions. However, if the user desires to obtain information immediately or so, the user may intuitively input key words in place of answering to questions.

For example, if the user happens to make a business trip suddenly, the user inputs "airline ticket to Hokkaido". This word is inputted to a specific state key word generation part 24*d*. The specific state key word generation part 24*d* creates two key words of "Hokkaido" and "airline ticket", from the inputted words, and the created key words are stored into a specific state key word storage part 29*f*.

User information can be collected or key words can be created from daily life of the user, without depending on input as described above. For example, switching-on of the user computer may be stored every time the switch of the user computer is turned on. The time at which the user computer was turned on most frequently can then be calculated to grasp the time range in which the user connects the Internet. Otherwise, from the contents of the web page which was directly accessed and downloaded by the user, it is possible to create a key word concerning an event as an interest target of the user.

(Application Example 1 Using Agent System)

The contents of questions from the character and chats with the character may be changed depending on the attributes of the user, such as sex, occupation, age, and the like. Hence, the setting may be arranged such that a question such as "who will you talk with?" or the like is given when a pet appears, and then, conversation develops in compliance with the user.

(Application Example 2 Using Agent System)

The agent system 21 may be provided with a mail function. Mails can be sent through the character by the mail function, so that the system can be used as a communication tool with another person who also has an agent system 21.

When a mail is sent through the communication channel network 2, character display data and processed user information are attached to the mail. Processed user information means that user information is not directly presented but information and the like which other person may know are presented after further processing.

In this case, of the contents about which conversation has been made with the character, there is provided a function to conceal those contents that should be kept secret particularly. Alternatively, there may be provided with such a function which allows the character to inform the user of such contents which are hard to notice by mail.

(Application Example 3 Using Agent System)

The agent system 21 may be provided with a health management function. In this case, a dictionary about symptoms and treatments is registered in the provided-information storage part 31 of the knowledge data base 26.

When the user inputs "stomachache" through conversation with the character, the agent system 21 creates key words of "stomach" and "ach", and information concerning stomachache is provided for the user from the provided-information storage part 31.

For example, in case of a stomachache, names of disease such as "influenza", "food poisoning", "gastritis", and the like which are associated with a stomachache, and symptoms thereof are displayed. If the user selects a name of disease which the user thinks to be hitting, the treatment for the disease is further displayed. At this time, the character is displayed, putting on a white gown and a stethoscope.

At this time, if the computer is on line, the agent system 21 accesses the server 3 and detects web pages of drug manufactures which introduce medicines concerning the disease and addresses of web pages of special hospitals. The web pages and addresses are provided for the user.

Further, as a function for daily health management, there may be provided a calorie calculation function. In this case, calories data concerning ingredients and foods and calorie calculation formulas are stored previously in the provided-information storage part 31.

The user records daily meals with use of the user computer 1. Key words are then created from the contents of the records. Information related thereto is read from the provide-information storage part 31, and calorie calculation is carried out, to present the calories.

Daily records of meals may be stored for a predetermined period. Data of articles which the user eats within the period and calorie data thereof may be compiled for every day, week, and month. What nutrients are insufficient to what extent and how excessive the calorie is may be notified.

(Application Example 4 Using Agent System)

The agent system 21 may be provided with a shopping function. The shopping function allows the agent system 21 to do shopping in place of the user who is busy.

For example, this shopping function does such shopping which the user particularly wants someone to substitute, such as shopping for daily foods or so, thereby to reduce housework of the user. To utilize the shopping function, procedures such as payments are necessary, and a user identifier and password which are notified only to the user are used.

For the shopping function, the provided information storage part 31 stores various menus, information concerning food materials necessary for menus, video information visually showing various menus, and the like, as data. Various menus are displayed in form of a list if the user inputs "which menu will I have today?" in conversation with the character.

If the user selects a predetermined menu and a number of persons, the kinds of necessary food materials and necessary amounts are displayed sequentially. The user confirms stocked food materials and determines necessary food materials to buy. The user also determines time to buy. The time to buy is registered in the timer.

After the items and time to buy are determined, data thereof is stored into a storage part such as a HDD or the like. Further, when the time comes, desired articles are automatically purchased by the following processing of the shopping function.

At first, when the time to buy comes, the agent system 21 starts operating. If the agent system 21 has already started up, the character notifies the user of the purchase. At this time, the character is displayed with a shopping basket in one hand. If the agent system 21 has not yet started up, the user starts up the system or the agent system 21 is started up by the timer.

At first, the user identifier and pass word are sent to the server 3 through the communication channel network 2, to achieve identification of the user. Next, information concerning commercial articles is sent to the server 3.

The side of the server 3 accesses a web page which deals with the articles to buy, and obtains information concerning the commercial articles as purchase targets, which is presented to the user. The information concerning the commercial articles is shown in form of a list, for example, and final confirmation with the user is settled by clicking the articles.

If the side of the user thinks that time is not enough to confirm the purchase and that the user may entrust the purchase to the agent system 21, the user also sends information saying that this shopping is entrusted to the agent system, at the same time when the user sends information concerning the articles to buy to the server 3.

Thus, commercial articles necessary for the user are purchased automatically. A payment method in case of using the shopping function is selected among credit card, bank account payment, and cash on delivery. It is preferable if the user can select either the selection of a payment method should be made at the time of purchase or should be previously made, in compliance with the situation of the user.

(Application Example 5 Using Agent System)

In the side of the server 3, there may be provided a function to provide much more of information by widening variations from a key word. For example, if information concerning a certain artist should be obtained, another artist who belongs to the same category as that of the certain artist, selected based on the name of the artist, and information of the another artist may be provided together. In this manner, the user can obtain unexpected information in the field in which the user is interested, resulting in an effect that the user feels twice fun to obtain information.

INDUSTRIAL APPLICABILITY

As has been explained above, according to the present invention, the form of the character changes in correspondence with the type of information to be provided for the user. The user can therefore intuitively understand the contents of the information and can immediately accept the information.

Whether the system is on or off line, things which the user is daily interested in can be collected and analyzed through conversation with a character conscientiously. The user can therefore obtain information which complies with tastes of the user, and simultaneously, the information providing side can provided effective information.

Further, since information is provided through a character, the system can contribute to environments which cause much stress due to residential reasons. That is, a pet appears and the user can communicate with the pet, every time the computer is operated. The fun to use the computer increases twice and fun to grow the pet can be enjoyed because the character grows up as user information is compiled more.

In the present invention, the system can be used both when the user is home and when the user is outside. That is, if the agent system is provided in a mobile terminal, it can be used at places where the user goes.

Further, if the agent program and the like are provided in the side of the user computer, the concealment of user information can be kept. Also, when the number of users increases, the side of the server 3 can be prevented from being burdened too much, so that maintenance of the server 3 can be facilitated.

The invention claimed is:

1. An agent system providing information for a user by displaying a computer-controlled character, comprising:
   an agent program portion provided in a user computer connected to a communication channel of a network;
   a user information storage portion storing user information; and
   a character display data storage portion storing character display data for determining a display form of the character, the character display data storage portion including:
   an outer state storage part for storing outer parameters describing physical properties of the character; and
   an inner state storage part for storing inner parameters describing personal feelings of the character,
   wherein the agent program portion is adapted to (i) collect the user information and information selected by the user, (ii) create a key word based only on the user information, and (iii) use the character for:
   obtaining the selected information from a server connected to the network;
   providing the selected information to the user with the display form of the character;
   varying the display form of the character based on the selected information and the character display data in compliance with a type of the selected information; and
   inquiring at predetermined times on user selections.

2. The agent system according to claim 1, wherein the selected information is information from at least one web page.

3. The agent system according to claim 2, wherein the information from the at least one web page is downloaded to and is then displayed on the user computer.

4. The agent system according to claim 1, wherein the key word is created based on an answer given by the user to a question asked by the character.

5. The agent system according to claim 1, wherein the key word includes an address of at least one web page accessed by the user computer through the communication channel of the network.

6. The agent system according to claim 1, wherein the user computer includes a mobile computing apparatus.

7. A method for providing a user with information using a computer-controlled character, the method comprising:
- collecting individual information of the user;
- creating a key word based only on the individual information of the user;
- searching specific information selected by the user based on the key word using the character, the character being adapted for obtaining the selected information from a server connected to a network;
- selecting for the character a form based on the specific information;
- storing outer parameters describing physical properties of the character;
- storing inner parameters describing personal feelings of the character;
- providing the specific information to the user by displaying the character in the selected form and varying the selected form of the character based on a type of the selected information; and
- inquiring at predetermined times on user selections.

8. The method according to claim 7, wherein the specific information is information from at least one web page.

9. The method according to claim 7, wherein the individual information is obtained from user answers to questions asked by the character.

10. The method according to claim 7, wherein the individual information is obtained from data inputted by the user based on a conversation with the character.

11. An information providing apparatus, comprising:
- a processing unit adapted for executing:
  - an agent program creating a computer-controlled character;
  - a first process of obtaining user information;
  - a second process of determining a character display form using character display data including outer parameters describing physical properties of the character and inner parameters describing personal feelings of the character;
  - a third process of collecting the user information and/or information selected by the user;
  - a fourth process of creating a key word based only on the user information; and
  - a fifth process of providing the selected information to a user with the character display; and varying the character display form, the outer and inner parameters of the character, the selected information and the character display data in compliance with a type of the selected information;
- a transmission/reception unit adapted to transmit information to and receive information from a user computer through a communication channel of a network using the character;
- an information storage unit storing predetermined information; and
- an information search unit adapted to search the predetermined information using the key word.

12. The apparatus according to claim 11, wherein the processing unit is a portion of the user computer or a server computer.

13. The apparatus according to claim 11, wherein the transmission/reception unit, the information storage unit, and the information search unit are provided in the user computer or a server computer.

14. A data recording medium storing a computerexecutable program having instructions for performing a method, the method comprising:
- collecting user information and information selected by a user;
- creating a key word based only on the user information;
- selecting a display form for a computer-controlled character;
- storing outer parameters describing physical properties of the character;
- storing inner parameters describing personal feelings of the character;
- varying the display form based on the selected information; and
- displaying the outer parameters, the inner parameters, and the selected information using the display form of the character.

* * * * *